US012792066B1

(12) United States Patent
Sengupta et al.

(10) Patent No.: US 12,792,066 B1
(45) Date of Patent: Nov. 10, 2026

(54) GPS SATELLITE FAULT DETECTION USING SINGLE AXIS AND HORIZONTAL PLANE STATISTICAL TESTS

(71) Applicant: Reliable Robotics Corporation, Mountain View, CA (US)

(72) Inventors: Prasenjit Sengupta, Mountain View, CA (US); Matthew Thomas Nehrenz, Campbell, CA (US)

(73) Assignee: Reliable Robotics Corporation, Mountain View, CA (US)

( * ) Notice: Subject to any disclaimer, the term of this patent is extended or adjusted under 35 U.S.C. 154(b) by 199 days.

(21) Appl. No.: 18/752,744

(22) Filed: Jun. 24, 2024

Related U.S. Application Data

(60) Provisional application No. 63/522,999, filed on Jun. 23, 2023.

(51) Int. Cl.

| | |
|---|---|
| ***G05D 1/86*** | (2024.01) |
| ***G01S 19/23*** | (2010.01) |
| ***G01S 19/42*** | (2010.01) |
| ***G05D 1/248*** | (2024.01) |
| *G05D 109/22* | (2024.01) |

(52) U.S. Cl.
CPC ................ *G05D 1/86* (2024.01); *G01S 19/23* (2013.01); *G01S 19/423* (2013.01); *G05D 1/248* (2024.01); *G05D 2109/22* (2024.01)

(58) Field of Classification Search
CPC .......... G05D 1/86; G05D 1/248; G01S 19/23; G01S 19/423
USPC ..................................................... 342/357.25
See application file for complete search history.

(56) References Cited

U.S. PATENT DOCUMENTS 11,585,941 B2 * 2/2023 Lemke .................. G01S 19/215
2021/0173090 A1 * 6/2021 Wu ...................... G01S 19/072

FOREIGN PATENT DOCUMENTS

KR 20230031189 A * 3/2023 ............... G05D 1/43
WO WO-2021133246 A1 * 7/2021 ............ G08G 5/723

OTHER PUBLICATIONS

Blanch, J. et al., "Baseline Advanced RAIM User Algorithm and Possible Improvements," IEEE Transactions on Aerospace and Electronic Systems, vol. 51, No. 1, Jan. 2015, pp. 713-732.
Blanch, J. et al., "RAIM with Optimal Integrity and Continuity Allocations Under Multiple Failures," IEEE Transactions on Aerospace and Electronic Systems, vol. 46, No. 3, Aug. 9, 2010, pp. 1235-1247.
RTCA SC-159, WG-2, Document DO-229E, "Minimum Operational Performance Standards (MOPS) for Global Positioning System/Wide Area Augmentation System Airborne Equipment," Dec. 2016, pp. 1-528.

* cited by examiner

*Primary Examiner* — Harry K Liu
(74) *Attorney, Agent, or Firm* — Fenwick & West LLP

(57) ABSTRACT

An aircraft applies different statistical tests for satellite fault detection and exclusion to position solutions of the aircraft depending on the current phase of flight of the aircraft to determine a position solution for the aircraft. The aircraft may apply a three-axis test via a single-axis statistical test along each of the three LVLH or ENU axes to the position solutions during a mostly straight phase of flight or a horizontal-axis statistical test to the position solutions during a turning phase of flight.

19 Claims, 8 Drawing Sheets

500

GPS SATELLITE FAULT DETECTION USING SINGLE AXIS AND HORIZONTAL PLANE STATISTICAL TESTS

CROSS-REFERENCE TO RELATED APPLICATION

This application claims the benefit of U.S. Provisional Application No. 63/522,999 filed on Jun. 23, 2024, which is hereby incorporated by reference in its entirety.

BACKGROUND

Field

This disclosure relates generally to aircraft localization and more specifically to Global Navigation Satellite System (GNSS, including GPS, Galileo, and other satellite constellations supporting navigation) fault detection using different statistical tests that are each associated with different phases of flight of an aircraft to identify a position of the aircraft.

Related Art

Successful takeoff, landing, taxiing, and other phases of flight require that the position and orientation of an aircraft with respect to a landing or takeoff site, such as a runway, or a ground movement site, such as a taxiway, be known to a high degree of certainty. Current systems for navigation (e.g., navigation to or in the vicinity of an airport) require installation and maintenance of expensive apparatus, lack the precision required for automated flight procedures, are not sufficiently reliable, and/or are prone to interference. Existing forms of receiver autonomous integrity monitoring (RAIM) assess the integrity of GNSS signals in safety-critical applications, such as aircraft operations. However, traditional approaches to RAIM generally achieve protection levels too large for many operations, such as autonomous aircraft takeoff or landing.

Advanced RAIM (ARAIM) has been developed to improve upon RAIM by expanding the applicability of RAIM techniques. ARAIM uses statistical data relating to sensor information for fault detection and exclusion (FDE), in which faulty pseudorange measurements from faulty satellites are excluded and position estimation of an aircraft is performed without the faulty pseudorange measurements. Existing ARAIM methods perform FDE in the East, North, Up (ENU) coordinate frame. FDE in the ENU frame does not sufficiently address takeoff, approach, landing, rollout, and taxi operations, operations where along-track and cross-track checks relative to a fixed feature (e.g., runway, taxiway) are required using different allocations for false alert and hazardously misleading information probabilities. Performing ARAIM in the Local-Vertical, Local-Horizontal (LVLH) frame with axes in three different directions-specifically an "along-track" axis, a "cross-track" axis, and a "vertical" axis allows for the use of ARAIM during the above operations as the along-track and cross-track axes are aligned with the runway or taxiway. While ARAIM in the LVLH frame improves location precision in takeoff, approach, landing, rollout, and taxi phases, it is subject to false positive error determinations in scenarios where a satellite is directly along one of the three axes at issue such as during the cruise phase of flight, where the aircraft performs heading changes frequently. These false positives result in aircraft maneuvering that is inefficient, such as an aborted operation that could have been avoided.

SUMMARY

In one embodiment, an aircraft applies different statistical tests for satellite fault detection and exclusion (FDE) depending on the current phase of flight of the aircraft to determine a position solution for the aircraft. That is, the aircraft selects a statistical test from a plurality of different statistical tests to perform FDE depending on the current phase of flight of the aircraft.

The aircraft receives satellite range measurements from GNSS receivers tracking multiple satellites. The received satellite range measurements are input to a set of parallel tightly-coupled filters, and each filter produces a candidate position solution of the aircraft. The aircraft identifies, from these candidate position solutions, one or more positions solutions that are valid and any position solutions that are invalid or faulty by applying a statistical test to the position solutions where the statistical test is selected based on the current phase of flight of the aircraft. The aircraft excludes any invalid position solutions in the determination of the position solution of the aircraft. Thus, the aircraft determines the position solution of the aircraft according to the valid position solutions that were identified using the statistical test.

For example, the aircraft performs FDE using a horizontal-plane statistical test during a turning phase (i.e., a cruise-like phase) of the aircraft that includes the climb, cruise, and descent phases of flight. The horizontal-plane statistical test combines FDE in the along-track axis and cross-track axis into a single calculation. During the turning phase of flight, the aircraft performs frequent heading changes that result in quick changes in the individual along-track axis and cross-track axis directions. Errors in FDE such as false detections or wrong exclusions of satellites may occur during these maneuvers. By combining the along-track axis and cross-track axis into the horizontal-plane calculation, error is reduced.

In another example, the aircraft performs FDE during a phase of the aircraft during which the aircraft is mostly straight (i.e., an approach-like phase) with respect to the takeoff runway, landing runway or taxiway such as the takeoff, approach, landing, rollout, and taxi phase of flight using a three-axis fault test, where single-axis statistical tests are performed individually along all three axes (e.g., "along-track" axis, a "cross-track" axis, and a "vertical" axis). During these phases, the aircraft is no longer performing frequent maneuvers, and the aircraft is typically aligned with the takeoff runway, landing runway, or taxiway. Thus, FDE can be performed using the three-axis (LVLH) statistical test, where the LVLH axes are aligned with the takeoff runway, landing runway, or taxiway.

Figure 1A:
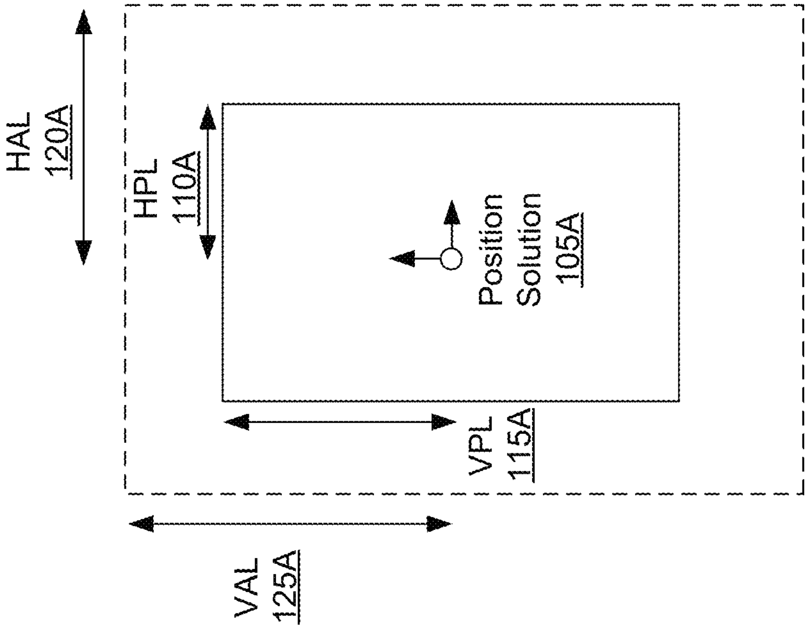
FIG. 1A is an illustration of protection levels and alert limits for a position solution, according to a first embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

I. System Overview

An aircraft uses position solutions to determine its location with reference to the Earth. The aircraft uses these position solutions when performing aircraft operations during all phases of flight of the aircraft. These phases of flight include a taxi phase, a takeoff phase during which the aircraft goes through a transition from moving along the ground (taxiing) to flying in the air, a climb phase in which the aircraft ascends to cruise altitude, a cruise or enroute phase during which the aircraft motion includes heading changes at nearly constant airspeed and altitude, a terminal area or descent phase during which the aircraft begins to descend as it approaches the vicinity of an airport, an approach phase during which the altitude of the aircraft decreases further in preparation for landing, a landing phase during which the aircraft touches down on the ground, a rollout phase during which the aircraft proceeds down the runway as it slows to taxi speed, and another taxi phase heading to the assigned gate. In one embodiment, the takeoff phase, approach phase, landing phase, rollout phase, and taxi phase of the aircraft are considered to be part of an "approach-like" phase or a "mostly straight phase" of the aircraft since the aircraft is aligned with the landing runway, takeoff runway, or other reference path (e.g., the taxiway) and is not making turns during these phases. In one embodiment, the climb phase, the cruise phase, and the descent phase are considered to be part of a "turning" phase or "cruise-like" phase during which the aircraft is making turns during the different phases of the aircraft that are included in the turning phase. The utility of these position solutions increases with improved accuracy and precision, particularly when this improved performance is known or at least bounded in real-time. This is particularly true for autonomously guided aircraft, where a pilot or external observer may not be able to perform recovery operations if autonomous systems fail.

As aircraft move at high speed, they typically need position solutions to be updated very frequently for these position solutions to be useful. As described herein, a GPS system of an aircraft selects a statistical test from a plurality of different statistical tests to identify valid position solutions and invalid position solutions, thereby increasing the accuracy and "trustworthiness" of the position solutions. In one embodiment, the GPS system selects the statistical test to apply to the position solutions based on the current phase of flight of the aircraft. Thus, the GPS system determines which of a plurality of different phases of flight is a current phase of flight of the aircraft and selects a statistical test that corresponds to the current phase of flight. The method of how to determine the current phase of flight of the aircraft is well known to those of ordinary skill in the art and is omitted for ease of description.

For example, the GPS system may select a horizontal-plane statistical test to apply to positions solutions during the turning phase (e.g., climb, cruise, and descent phases) of the aircraft and select a three-axis statistical test in which a single-axis statistical test is performed along each axis of the LVLH coordinate frame to apply to position solutions during the mostly straight phase (e.g., the takeoff, approach, landing, rollout, and taxi phases) of the aircraft.

Note that the taxi phase has two sub-phases: (a) moving along straight taxiways, and (b) turning from one taxiway to another. Thus, it may be advantageous to apply the three-axis statistical test during the straight sub-phases and the horizontal-plane statistical test during turning sub-phases.

Though various techniques are described herein with reference to a GPS system, alternative GNSS systems may be employed, alone or in combination with each other and GPS, without deviating from the principles set forth herein. For example, other techniques may employ GLONASS, Galileo, Beidou, Quasi-Zenith Satellite System (QZSS), and/or other GNSS systems without departing from the principles set forth herein. Likewise, though various techniques are described herein with reference to a WAAS system, alternative augmentation systems (e.g., SBAS systems) may be employed without deviating from the principles set forth herein.

FIG. 1A is an illustration of protection levels and alert limits for a position solution, according to a first embodiment. In one embodiment, a position solution indicates a location of an aircraft. A position solution 105A has a horizontal protection level (HPL) 110A and a vertical protection level (VPL) 115A. The position solution 105A also has a horizontal alert limit 120A and a vertical alert limit 125A. The HPL 110A and VPL 115A are statistical bounds on position error in their respective dimensions, with the HPL 110A acting as a two-dimensional radius about the aircraft (shown in one dimension in the figure) and the VPL 115A applying to space above and below the aircraft. Each protection level bounds position error within a specified confidence expressed as a probability, e.g., the true position of the aircraft in a particular dimension is within the space defined by the protection level with a probability of 0.99999, representing 99.999% confidence. Each protection level is calculated by the aircraft (e.g., a RAIM system of the aircraft) based on data including error estimates on measurements such as pseudoranges received from a set of satellites. As such, measurements with smaller error estimates lead to smaller protection levels, and measurements with greater error estimates lead to larger protection levels.

If the aircraft receives low quality measurements with large error estimates, the generated protection levels may grow large enough that they exceed the horizontal alert limit (HAL) 120A or the vertical alert limit (VAL) 125A. If one or more of the aircraft's protection levels exceed the respective alert limits for longer than a required "time to alert," e.g., 2 seconds, the aircraft attempts to exclude faulty measurements causing this situation or, failing that, issues an alert. Depending upon the embodiment, the aircraft may exclude faulty measurements before the time to alert, e.g., upon obtaining measurements with error estimates exceeding a threshold error value (which may be the alert limit, according to one embodiment). Depending upon the embodiment, the aircraft may also alert before the time to alert when certain conditions are met, e.g., when the aircraft receives a threshold consecutive number of measurements (e.g., one, two, or three) having error estimates of at least a threshold error value (e.g., twice the alert limit).

The aircraft may issue an alert to a pilot of the aircraft, or to an internal system of the aircraft to initiate corrective action, e.g., abort a landing attempt and conduct a "missed approach" operation. Alert limits are issued for each type of aircraft operation and specify the maximum level of navigation error in each dimension beyond which unacceptable ("unsafe") hazards will occur to aircraft and their occupants.

Figure 1B:
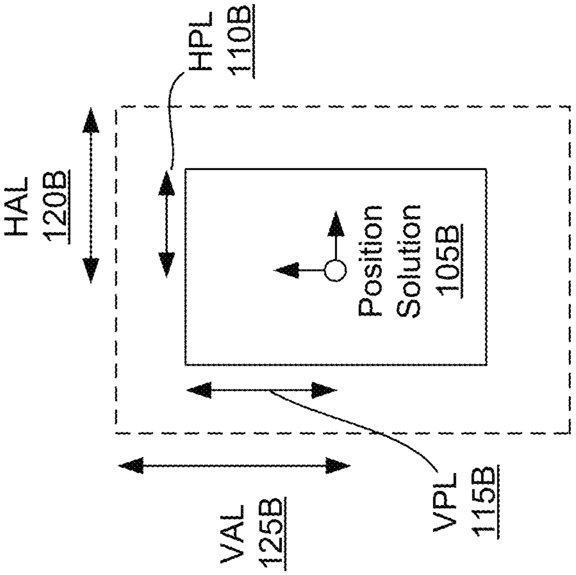
FIG. 1B is an illustration of protection levels and alert limits for a position solution, according to a second embodiment.

FIG. 1B is an illustration of protection levels and alert limits for a position solution, according to a second embodiment. The position solution 105B is more accurate in that it has a smaller HPL 110B and VPL 115B than position solution 105A. Techniques described herein provide for smaller protection levels, which in turn allow for operations with tighter alert limits, such as HAL 120B and VAL 125B. For example, position solution 105A may have an HPL 110A of 15 meters, a VPL 115A of 25 meters, an HAL 120A of 40 meters, and a VAL 125A of 35 meters. In contrast, position solution 105B may have an HPL 110B of 10 meters, a VPL 115A of 15 meters, an HAL 120B of 15 meters, and a VAL 125B of 20 meters. As such, an aircraft with position solution 105B can perform more demanding aircraft operations (i.e., those with tighter requirements on position errors) using the more accurate position solution 105B, such as autonomous landing, which an aircraft using position solution 105A cannot perform.

Figure 1C:
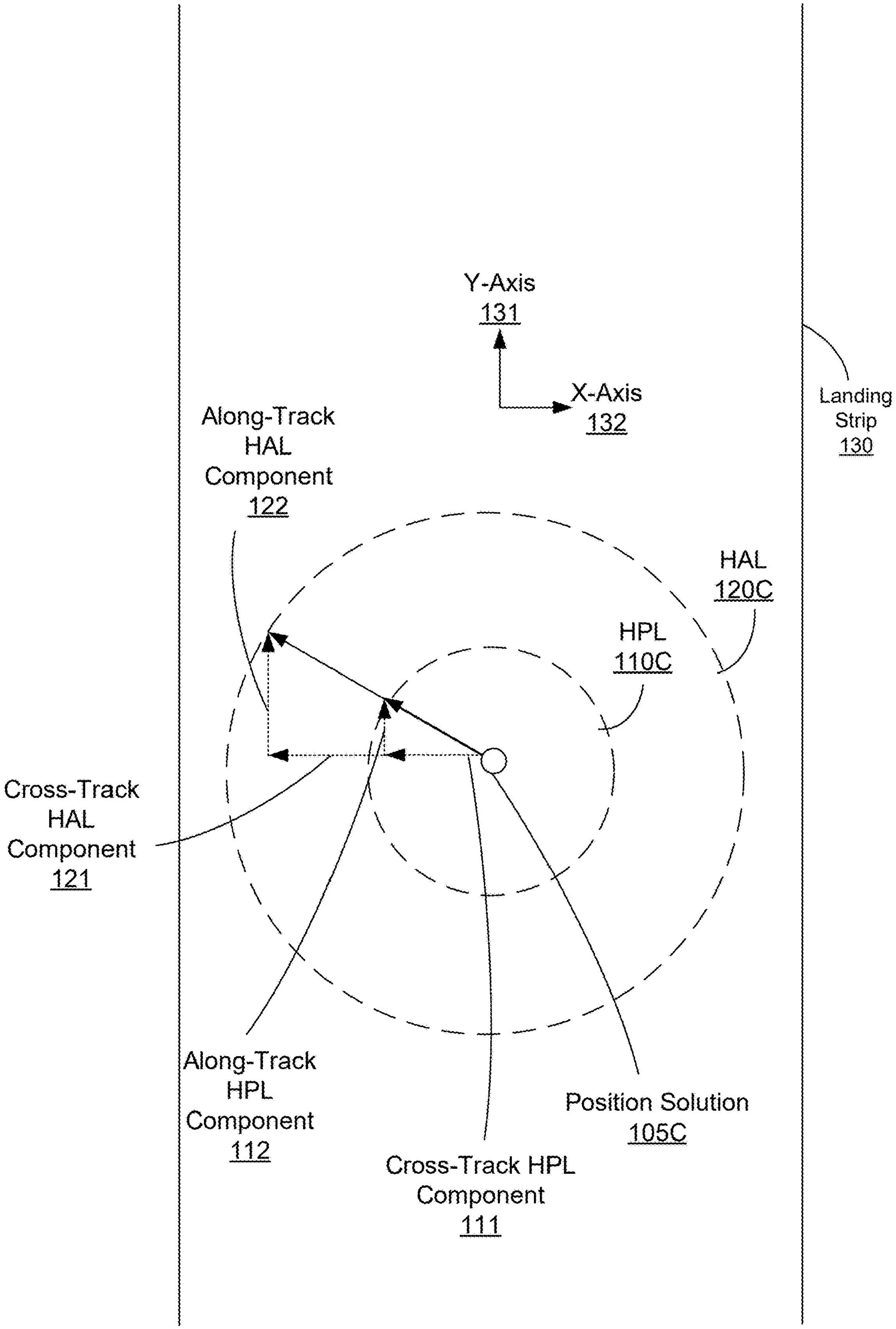
FIG. 1C is an illustration of protection levels and alert limits for a position solution, according to a third embodiment.

FIG. 1C is an illustration of protection levels and alert limits for a position solution, according to a third embodiment. The position solution 105C has an HPL 110C that is split into an "along-track" HPL component 112 that is parallel to the long axis of a runway or landing strip 130 (e.g., Y-Axis 131) and a "cross-track" HPL component 111 that is perpendicular to the long axis of a landing strip (e.g., parallel to the X-Axis 132 and perpendicular to the Y-Axis 131). Similarly, the position solution 105C has an HAL 120C that is split into an "along-track" HAL component 122 that is parallel to the long axis of a landing strip 130 and a "cross-track" HAL component 121 that is perpendicular to the long axis of a landing strip.

In an embodiment, the aircraft divides the HPL 110C and HAL 120C into respective components and similarly divides an error estimate of the position solution 105C to more accurately evaluate the aircraft's location with respect to the landing strip 130. Landing strips 130 are generally much longer than they are wide, such as (e.g.) 2,500 meters long but only 50 meters wide. The safe touchdown zone specified by the Federal Aviation Administration for precision landings under low-visibility conditions reflects this by being 2700 ft long (in the along-track direction, parallel to the long axis of the landing strip) but only 70 ft wide (in the cross-track direction, perpendicular to the long axis of the landing strip). As a result, there is much greater room for error in the along-track direction than in the cross-track direction when positioning a landing aircraft over and onto the landing strip 130. Separating the along-track and cross-track components of the horizontal position solution, protection level, and alert limit as shown in FIG. 1C prevents large (but tolerable) error bounds in the along-track direction from preventing landing operations unnecessarily. As explained above, the cross-track component of HAL 121 is much more constraining than the along-track component 122. Thus, aircraft are allowed to initiate landing operations if the entirety of the cross-track HPL component 111 is within the cross-track HAL component 121 (which is itself within the bounds of the landing strip 130), but the along-track constraint is much looser and (in practice) non-limiting.

Figure 2:
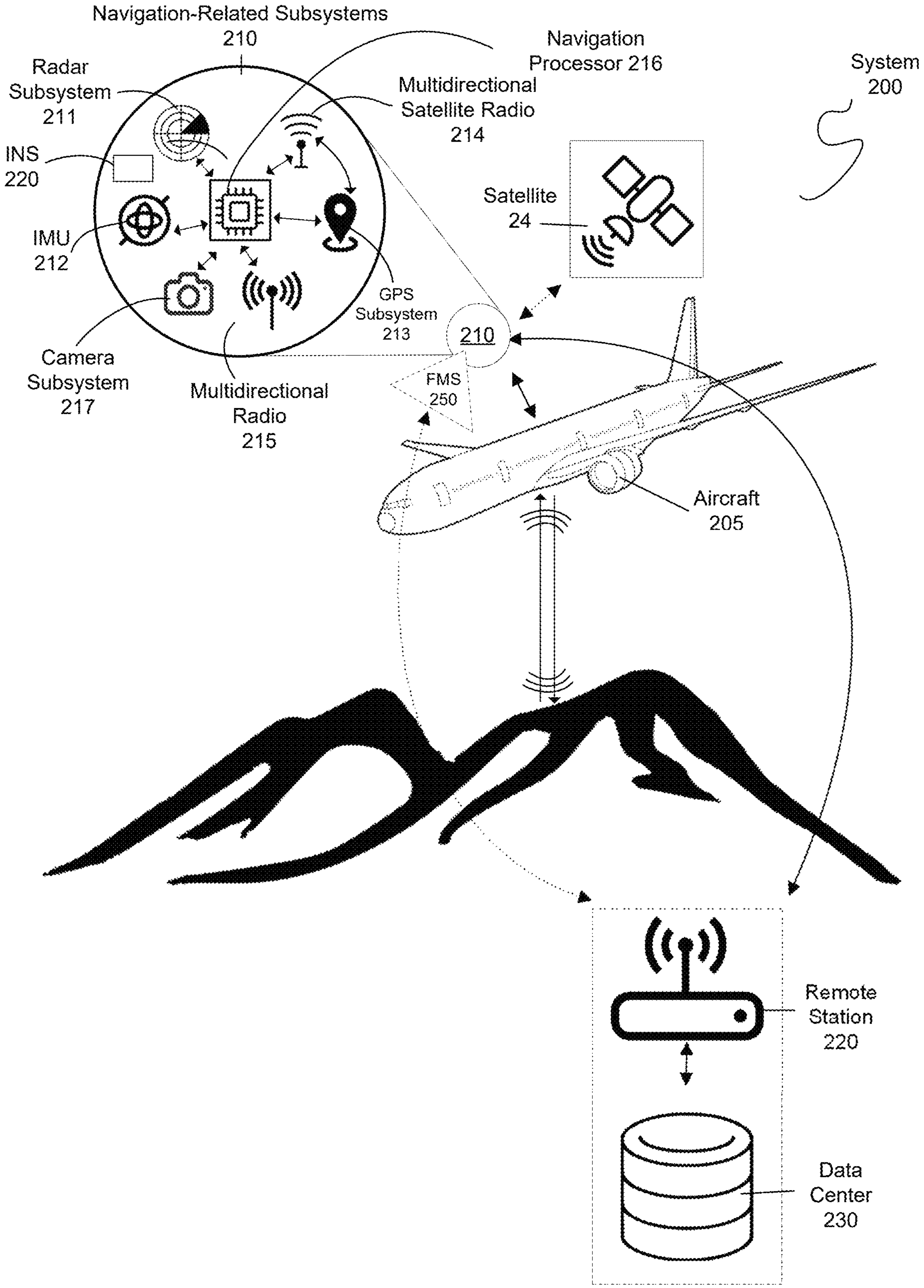
FIG. 2 is a simplified diagram of an aircraft environment, according to one embodiment.

FIG. 2 is a simplified diagram of an aircraft environment, according to one embodiment. The aircraft environment is a system 200 for localization (e.g., in relation to a landing site and/or takeoff site, or in relation to other phases of flight), in accordance with one or more embodiments. The system 200 can include one or more subsystems 210 for localization and/or navigation that are coupled to (e.g., mounted to, onboard, within, etc.) an aircraft 205, where the subsystems are described in more detail below. The system 200 can also optionally include a remote station 220 in communication with a data center 230 at a location remote from the aircraft 205, such that some computing functions can be performed at a location remote from the aircraft 205. The system 200 can also include a flight management system (FMS) 250 including interfaces between the remote station 220 to the FMS 250 and/or interfaces between the subsystems 210 and the FMS 250. The system 200 provides structures, subsystem interfaces, and operation modes useful for implementation of piloted and automated flight operations, including operations associated with techniques described in more detail below.

The system 200 functions to augment position estimation during flight operations (e.g., takeoff operations, landing operations, other flight operations) across multiple subsystems (e.g., GPS-associated subsystems, such as a RAIM system) associated with an aircraft 205. Improved position solutions, especially during terminal flight operations, can improve decision making (e.g., automated decision making, guidance provided to a human flight operator, instructions provided to subsystems for automating flight control of the aircraft, etc.).

The system can exploit various global navigation satellite system (GNSS) augmentation systems and/or additional systems from which it receives position data, depending upon the embodiment. For example, depending upon the embodiment, the aircraft may receive supporting data (e.g., corrections to measured pseudoranges and bounds on errors in these corrections) originating from one or more of an SBAS, a WAAS, a Ground-based Augmentation System (GBAS), a Precise Point Positioning (PPP) network, a standalone or networked real time kinematic (RTK) positioning system, an instrument landing system (ILS) such as a Category-I ILS, Category-II ILS, or Category-III ILS, a microwave landing system (MLS), or a computer vision system of the aircraft.

In some embodiments, the system 200 can also correct for error drift in localization subsystems and/or allow localization subsystems to operate continuously when one or more components of the navigation subsystems are unavailable. In some embodiments, the system 200 can also perform automated flight operations based on improved localization accuracy resulting from augmented position estimation. In some embodiments, and in relation to improved operation, the system 200 improves "worst-case" error bounds (i.e., the protection levels described above) of a position solution that is identified by applying a selected statistical test that is dependent on the phase of flight of the aircraft 205.

1.1 System—Aircraft

The aircraft 205 shown in FIG. 2 is a fixed-wing aircraft. The aircraft has flight control surfaces for aerodynamically affecting flight of the aircraft relative to a pitch axis (i.e., a transverse axis), a yaw axis (i.e., a vertical axis), and a roll axis (i.e., longitudinal axis) of the aircraft. Flight control surfaces can include one or more of: ailerons, flaps, elevators, stabilizers (e.g., horizontal stabilizers), rudders, spoilers, slats, air brakes, vortex generators, trim surfaces, and any other suitable control surfaces. The aircraft also has a power plant for generation of mechanical power associated with flight operations, and in variations, the power plant can include one or more of: a piston engine (e.g., in-line engine, V-type engine, opposed engine, radial engine, etc.), a gas turbine engine (e.g., turbojet engine, turbofan engine), a pulse jet, a rocket, a Wankel engine, a Diesel engine, an electric engine, a hybrid engine, and any other suitable power plant system. The power plant is coupled to an energy source (e.g., fuel system, battery, solar cell, etc.) and a cooling system (e.g., forced convection cooling system, liquid cooling system, oil cooling system, etc.) for aircraft performance in flight.

While this description uses a fixed-wing aircraft as an example, the principles described herein are equally applicable to variations of the aircraft 205 including form factors and/or control surfaces associated with one or more of: rotorcraft, gliders, lighter-than-air aircraft (e.g., airships, balloons), powered-lift aircraft, powered-parachute aircraft, weight-shift-control aircraft, rockets, and/or any other suitable types of aircraft. Still other variations of the system 200 can involve terrestrial vehicles, water vehicles, amphibious vehicles, or other non-aircraft vehicles.

1.2 System—Subsystems for Localization, Navigation, and/or State Detection

The subsystems 210 include subsystems capable of generating data associated with dynamic states of the aircraft, environments about the aircraft, operation states of aircraft systems (e.g., power plant systems, energy systems, electrical systems, etc.), and any other suitable systems associated with operations of the aircraft on the ground or in flight. The subsystems 110 also include subsystems capable of transmitting data to and from the aircraft 205 and other remote systems.

As such, the subsystems 210 include components that generate and receive information generated from subsystems coupled to the aircraft 205, as well as a navigation processor 216 providing computational infrastructure (e.g., processing components, communication buses, memory, etc.) for communicating data between the subsystems. The navigation processor 216 thus provides architecture for communication of data generated by subsystems, for communication with other systems remote from the aircraft 205, for control of subsystems, and/or for control of the aircraft. The navigation processor 216 can also include architecture for reporting navigation-associated information to an operator (e.g., pilot) of the aircraft 205, for instance, in manual operation modes or semi-manual operation modes where navigation states can be displayed to the operator (e.g., through an electronic flight instrument system). The subsystems 210 can thus include specialized computer components designed for use in an aircraft, and in particular, can include components that are customized in configuration relative to each other and customized in relation to processing of signals received and processed to perform aspects of the techniques described below.

Information routed between the subsystems 210 and other systems remote from the aircraft 205 can optionally be routed through a flight management system (FMS) 250, configured for automation of flight tasks in relation to a flight plan. The FMS 250 processes navigation database information (e.g., information associated with waypoints, airways, navigation aids, airports, runways, departure procedures, arrival procedures, holding patterns, etc.), aircraft subsystem statuses, and outputs of other subsystems (e.g., radar subsystems, sensor subsystems) and determines one or more desired flight paths based on the information. The FMS can cooperate with the navigation processor 216 in receiving outputs of other subsystems of the subsystems 210 and/or transmitting control instructions to affect operational states of other components of the subsystems 210. The FMS 250 can also include or interface with other control systems (e.g., of an autopilot) to transform calculated flight information into instructions for control of control surfaces of the aircraft 205 including one or more of: ailerons, flaps, elevators, stabilizers (e.g., horizontal stabilizers), rudders, spoilers, slats, air brakes, vortex generators, trim surfaces, and any other suitable control surfaces.

1.2.1 System—Radar Subsystem

As shown in FIG. 2, the subsystems 210 include a radar subsystem 211 mounted to the aircraft, where the radar subsystem 211 includes radar transmit and receive antennas configured to enable detection of features of objects associated with a flight path of the aircraft. Radar transmit antennas of the radar subsystem 211 emit in the radio portion of the electromagnetic spectrum. Radar transmit antennas can further transmit signals that have a wavelength, gain, carrier, pulse width, pulse repetition frequency, staggering, and any other suitable characteristic suitable for generation of return signals that can be processed to determine features of objects interacting with the transmitted signals. Radar receive antennas of the radar subsystem 211 receive in the radio portion of the electromagnetic spectrum and receive signals that have an effective aperture and gain. Radar receive antennas can be coupled with elements (e.g., filters, polarizers, etc.) configured to prevent or otherwise mitigate undesired return signals associated with clutter, interference, noise, and/or jamming. Radar receive antennas can additionally or alternatively be coupled with elements (e.g., attenuators) configured to prevent saturation of the receive elements from a return signal. Radar transmit and/or receive components can, however, be coupled to any other suitable elements (e.g., waveguides, duplexers, etc.) that refine aspects of the emitted and/or received signals in a desired manner. Furthermore, radar antennas can include phased array configurations (e.g., passive phased array configurations, active phased array configurations, conformal phased array configurations, etc.) or other suitable antenna configurations.

The radar subsystem 211 can have one or more radar antennas structurally mounted to the aircraft and positioned so as to transmit signals away from a ventral surface of the aircraft 205 and/or receive signals transmitted or reflected toward the ventral surface of the aircraft. As such, radar antennas can be configured to receive signals from terrain and/or other objects below the aircraft during flight. Antennas of the radar subsystem 211 can alternatively be positioned relative to the aircraft in any other suitable manner (e.g., coupled to a non-ventral surface) in order to receive signals that can be processed to determine locations of the aircraft in flight.

Multiple radar antennas can be used for system redundancy (e.g., in the event a subset of antennas are compromised). Multiple radar antennas can also be used for providing different positions from which to emit radar signals toward objects of interest and/or for receiving radar signals from objects of interest, depending upon orientation of the aircraft 205 or characteristics of objects from which return signals are generated.

The antenna(s) of the radar subsystem 211 can be coupled to an exterior portion of the aircraft 205. One or more antenna(s) of the radar subsystem 211 can alternatively be coupled to an interior portion of the aircraft 205 and extend through a wall of the aircraft 205 to transmit and/or receive signals outside of the aircraft 205. Mounting positions are associated with desired directionality in relation to transmitted radar signals and/or received signals, in relation to relative orientations between the aircraft and objects used to determine the location(s) of the aircraft 205 during flight. The antenna(s) of the radar subsystem 211 can thus be fixed in position. The antenna(s) of the radar subsystem 211 can alternatively be adjustable in position and/or rotation based on orientations of the aircraft in flight. The radar subsystem 211 can thus include actuators coupled to the antenna(s) of the antenna subsystem 211 and/or position encoders coupled to the actuators, in relation to electronic control of antenna positions.

The radar subsystem 211 produces output signals that have a characteristic resolution and power, and from which transmit time-related parameters (e.g., time between transmission of a signal and receipt of a return signal), distance-related parameters (e.g., distance between the aircraft and an object in relation to altimeter functions, other distance-related functions, etc.), reflector object parameters (e.g., shape, surface features, etc.), scattering parameters, frequency modulation parameters, speed-related parameters (e.g., change in distance between the aircraft and an object), and/or any other suitable parameters can be extracted to determine a location of the aircraft during flight.

Furthermore, while images are described, the radar subsystem 211 can be supplemented with or otherwise replaced with a light detection and ranging (LIDAR) subsystem that includes light emission elements and/or light sensors for receipt of optical signals indicative of features about the aircraft (e.g., in relation to light reflective objects, light scattering objects, light absorbing objects, light responsive objects, etc.), where the optical signals can be processed to determine locations of the aircraft 205 during flight, in relation to the techniques described in below. As such, the system 200 can implement other sensors that provide height information related to positions of the aircraft 205, in order to augment navigation of the aircraft 205 in space.

1.2.2 System—Camera Components

As shown in FIG. 2, the subsystems 210 include a camera subsystem 217 mounted to the aircraft, where the camera subsystem 217 includes sensors configured to capture features of the environment (e.g., takeoff environment, landing environment, flight environment, etc.) of the aircraft 205, features of objects in the vicinity of the environment of the aircraft, features of calibration objects along a path of operation of the aircraft, features of other objects along a path of operation of the aircraft, and/or any other suitable object aspects to facilitate automated landing of the aircraft at a desired landing site.

Sensors of the camera subsystem 217 can utilize the visible spectrum. Sensors of the camera subsystem 217 can additionally or alternatively include longwave infrared (LWIR) sensors (e.g., sensors operating in the 8-12 μm band) or others upon other bands of light. The camera subsystem 217 can also include optical elements (e.g., lenses, filters, mirrors, apertures etc.) for manipulating light reaching the sensors of the camera subsystem 217. In relation to detection of airport lighting systems for landing site localization relative to airport lighting, the camera subsystem 217 can include one or more filters optically coupled to the sensors and configured to detect spectra of light emitted from airfield landing systems (e.g., lighting systems in accordance with Federal Aviation Administration Advisory Circular 150/5345-46E). Variations of the camera subsystem 217 can, however, have any other suitable sensor types and/or optical elements associated with visible spectra and/or non-visible spectra electromagnetic radiation.

The camera subsystem 217 can have one or more cameras structurally mounted to the aircraft and positioned so as to enable detection of the landing site or other site relevant to operation of the aircraft, as the aircraft traverses through space. Multiple cameras can be used for system redundancy (e.g., in the event a subset of cameras have occluded optical elements) and/or for providing different field of view options depending on approach path and orientation to a landing site. The camera(s) of the camera subsystem 217 can be coupled to an interior portion of the aircraft 205 or can be coupled to an exterior portion of the aircraft 205. Mounting positions are associated with desired flight paths to a landing site (e.g., approach patterns, instructions from air traffic control, etc.). As such, the camera subsystem 217 can have a camera that has a field of view of at least 270 degrees about the aircraft 205. The camera subsystem 217 can additionally or alternatively have a first camera mounted toward a port side of the aircraft (e.g., for left traffic operations), a second camera mounted toward a starboard side of the aircraft (e.g., for right traffic operations), a third camera mounted toward a nose portion of the aircraft (e.g., for straight-in approaches), and/or any other suitable cameras mounted at any other suitable portion of the aircraft 205.

The camera(s) of the camera subsystem 217 can thus be fixed in position. The camera(s) of the camera subsystem 217 can alternatively be adjustable in position based on flight paths of the aircraft 105 to the landing site. The camera subsystem 217 can thus include actuators coupled to the camera(s) of the camera subsystem 211 and/or position encoders coupled to the actuators, in relation to electronic control of camera positions. In relation to image stabilization, the camera(s) of the camera subsystem 217 can be coupled to image stabilization subsystems (e.g., gimbals) to reduce artifacts due to vibration or other undesired image artifacts that would otherwise be included in image data generated from the camera subsystems 217.

The camera subsystem 217 produces output images that have a characteristic resolution (e.g., associated with a sensor size), focal length, aspect ratio, and/or directionality (e.g., unidirectionality associated with 360-degree images), format color model, depth, and/or other aspects. The camera subsystem 217 can be configured for one or more of: monoscopic images, stereoscopic images, panoramic images, and/or any other suitable type of image output. Furthermore, while images are described, the camera subsystem 217 can be configured to output video data.

1.2.3 System—IMU Components

The subsystems 210 also include one or more inertial measurement units (IMUs) 212 for measuring and outputting data associated with the aircraft's specific force, angular rate, magnetic field surrounding the aircraft 205, and/or other position, velocity, and acceleration-associated data. Outputs of the IMU can be processed with outputs of other aircraft subsystem outputs to determine poses of the aircraft 205 relative to a landing site (or other target), and/or pose trajectories of the aircraft 205 relative to a landing site (or other target). The IMU 212 includes one or more accelerometers, one or more gyroscopes, and can include one or more magnetometers, where any or all of the accelerometer(s), gyroscope(s), and magnetometer(s) can be associated with a pitch axis, a yaw axis, and a roll axis of the aircraft 205.

The IMUs 212 are coupled to the aircraft and can be positioned internal to the aircraft or mounted to an exterior portion of the aircraft. In relation to measurement facilitation and/or post-processing of data form the IMU, the IMU can be coupled to a vibration dampener for mitigation of data artifacts from sources of vibration (e.g., engine vibration) or other undesired signal components.

The one or more IMUs 212 are components of, or communicatively connected to, an inertial navigation system (INS) 220 of the aircraft, which, for simplicity of description, is described with reference to the GPS subsystem 213 below. However, depending upon the embodiment, the INS 220 may be its own independent subsystem of the aircraft. Alternatively, the aircraft may include an INS 220 and not the one or more IMUs 212, e.g., an INS with its own sensors. Also, for simplicity of description, the system is described henceforth with reference solely to the INS 220, though it is contemplated that alternative embodiments may employ one or more IMUs 212. The INS 220 is described in greater detail with reference to FIG. 3.

1.2.5 System—GPS Components

The subsystems 210 include the GPS subsystem 213 coupled to the aircraft along with aircraft-mounted antennas tuned to frequencies at which ranging signals are transmitted by satellites. Although described as a GPS subsystem 213 herein, the subsystems 210 may alternatively include a different GNSS subsystem corresponding to a different GNSS system when the alternative GNSS system, such as Beidou or another described above, is instead used by the aircraft. As such, the techniques described herein with reference to the GPS subsystem 213 may be applied using a different GNSS subsystem, though for brevity and clarity the techniques described herein solely reference a GPS subsystem 213.

The GPS subsystem 213 includes a set of redundant GPS receivers, where each GPS receiver is capable of carrying out all GPS and augmented GPS functions (e.g., as described herein). The GPS subsystem 213 includes (e.g., for each GPS receiver) an internal GPS processor, radio frequency (RF) circuitry, a clock, and a data link (e.g., wireless data link, wired data link). The GPS subsystem 213 can include a display and can include any suitable number of channels (e.g., greater than 12 channels, less than or equal to 12 channels, etc.) for receiving and tracking signals from different satellites. The GPS subsystem 213 can be electronically coupled to an electrical system of the aircraft 205 for power and/or alternatively include an independent power source (e.g., for a portable configuration). The GPS subsystem 213 can further be coupled to other subsystems 210. The GPS subsystem 213 can additionally or alternatively be coupled to the FMS 250. The GPS subsystem 213 can include one or more inputs for differential corrections (e.g., using the RTCM SC-104 or GBAS formats) and/or can be configured to receive GPS-like signals from one or more augmentation systems or additional systems as listed above, e.g., a Satellite Based Augmentation System (SBAS). Furthermore, the GPS subsystem 213 can include architecture for relaying data (e.g., location-associated data, time-associated data, velocity-associated data, etc.) to other data processing devices using a NMEA 0183 protocol or any other suitable protocol (e.g., SiRF protocol, MTK protocol, etc.).

The GPS subsystem 213 can have one or more antennas coupled to the aircraft 205 (e.g., within the aircraft, mounted to the aircraft) and positioned so as to mitigate signal reflections (i.e., multipath) or interference from other portions of the aircraft 205 (e.g., structural features of the aircraft) and/or other subsystems associated with the aircraft 205.

In relation to the INS, the GPS subsystem 213 can also be communicatively coupled to INS 220 as an INS-enabled (or IMU-enabled) GPS. In INS-enabled GPS configurations, the GPS subsystem 213 can thus include operational modes that output location-associated information and/or velocity-associated information-based outputs of the INS and a reference location of the aircraft 205 from the GPS, e.g., a most recent reference location from the GPS.

In relation to the GPS subsystem 213, the subsystems 210 can also include a multidirectional satellite transmission subsystem 214 (e.g., a multidirectional satellite radio) including relays for interfacing with one or more satellites including satellite 24. The satellite transmission subsystem 214 can thus include channels associated with the GPS subsystem 213 described above in relation to receipt and transmission of satellite signals associated with the GPS subsystem 213. The satellite transmission subsystem 214 can additionally or alternatively include channels associated with transmission and/or reception of satellite data for traffic avoidance in coordination with automatic dependent surveillance broadcast (ADS-B) functionality, for weather services (e.g., in relation to weather along flight path, in relation to winds aloft, in relation to wind on the ground, etc.), for flight information (e.g., associated with flight restrictions, for notices, etc.), and/or for any other suitable purpose. The satellite transmission subsystem 214 operates in approved frequency bands (e.g., bands approved through Federal Communications Commission regulations, bands approved through Federal Communications Commission advisory circulars, etc.). The system 200 can additionally or alternatively implement one or more other ground and/or space-based differential or augmentation systems, as listed above or otherwise.

1.2.6 System—Communication Components

The subsystems 210 also include a radio transmission subsystem 215 for communication with the aircraft 205, for transmission of aircraft identification information, or for transmission of other signals. The radio transmission subsystem 215 can include one or more multidirectional radios (e.g., bi-directional radios) onboard the aircraft, with antennas mounted to the aircraft in a manner that reduces signal transmission interference (e.g., through other structures of the aircraft). The radios of the radio transmission subsystem 215 operate in approved frequency bands (e.g., bands approved through Federal Communications Commission regulations, bands approved through Federal Communications Commission advisory circulars, etc.).

The communication-related components of the subsystems 210 can additionally or alternatively cooperate with or supplement data from other avionics components (e.g., the GPS subsystem 213), electrical components (e.g., lights), and/or sensors that support flight operations (e.g., in flight, during landing, on the ground, etc.), that support observability by other traffic, that support observability by other aircraft detection systems, that provide environmental information (e.g., pressure information, moisture information, visibility information, etc.) and/or perform other functions related to aircraft communications and observability.

1.3 System—Remote Components

As shown in FIG. 2, the system 200 can optionally include a remote station 220 that includes devices for wirelessly receiving data from and transmitting data to subsystems coupled to (e.g., onboard, the aircraft). The remote station 220 includes one or more multidirectional radios (e.g., bi-directional radios), with one or more antennas. The radios of the remote station operate in approved frequency bands (e.g., bands approved through Federal Communications Commission regulations, bands approved through Federal Communications Commission advisory circulars, etc.). In an embodiment, the remote station 220 is in communication with a data center 230 for storage and retrieval of data derived from subsystems of the aircraft 205 or useful to the aircraft, such as terrain maps. The data center uses storage and retrieval protocols and can use data encryption protocols for promoting security in relation to handling sensitive information pertaining to autonomous flight of the aircraft 205.

Depending upon the embodiment, the system 200 may include a plurality of remote stations 220. The system 200 may include a remote system 220 with which the aircraft 205 exchanges data, such as terrain maps. In an embodiment, the aircraft 205 stores one or more terrain maps locally. The terrain map includes geographical data that can used by the aircraft 205 in collaboration with a radar altimeter to generate a position solution, as described below. The system 200 may include a remote system 220 with which the aircraft exchanges data such as historic augmented system data. Alternatively, the aircraft 205 may store historic augmented system data locally.

The remote station 220 can also use communications technologies and/or protocols in relation to data transmission operations with the data center 230, subsystems of the aircraft 205, and/or the operator interface 240 described in more detail below. For example, the remote station 220 can have communication links using technologies such as Ethernet, 802.11, worldwide interoperability for microwave access (WiMAX), 3G, 4G, code division multiple access (CDMA), digital subscriber line (DSL), or other communication technologies. Examples of networking protocols used for communications with the remote station 220 include user datagram protocol (UDP) and/or any other suitable protocol. Data exchanged with the remote station 220 can be represented using any suitable format.

Furthermore, in relation to communications-related subsystems, if a communication does not operate as intended (e.g., a communication link fails), the aircraft 205 can be transitioned into a safety operation mode. In an example, in the safety operation mode, the aircraft 205 enters a holding pattern until operation of the communications-related subsystems are restored to proper operation or until the aircraft 205 can be operated safely/safely landed in another manner.

1.4 System—Conclusion

Variations of elements of the system 200 described above and shown in FIG. 2 can be configured in any other suitable manner. For instance, portions of one or more of: the navigation processor 216 onboard the aircraft 205, the FMS 250, the remote station 220, and/or the data center 230 can operate as a computing system that includes machine-readable instructions in non-transitory media for implementation of one or more techniques described herein.

In relation to flight control, the system 200 can include an electronic interface between the computing system (e.g., navigation processor 216, remote station 220) and an FMS 250 of the aircraft (e.g., as supported by the computing system), the electronic interface operable in a mode that transmits the set of instructions to the flight management system and controls operation of the aircraft. Depending upon the embodiment, the computing system and the FMS 250 may be the same component of the aircraft, or different aspects of the same component. One or more portions of the computing system described above can further include architecture for storing a database of navigation object characteristics relevant to flight paths of the aircraft 205, where the database of navigation object characteristics can include a high-resolution height map database of terrain, static objects, infrastructure associated with moving objects, passive and/or active markers, and/or other features below or in the path of the aircraft 205 during flight. The database can be accessed by portions of the computing system to facilitate portions of the techniques described herein.

While the system described above can implement embodiments, variations, and/or examples of the techniques described herein, the system can additionally or alternatively implement any other suitable method.

II. GPS Augmentation

Figure 3:
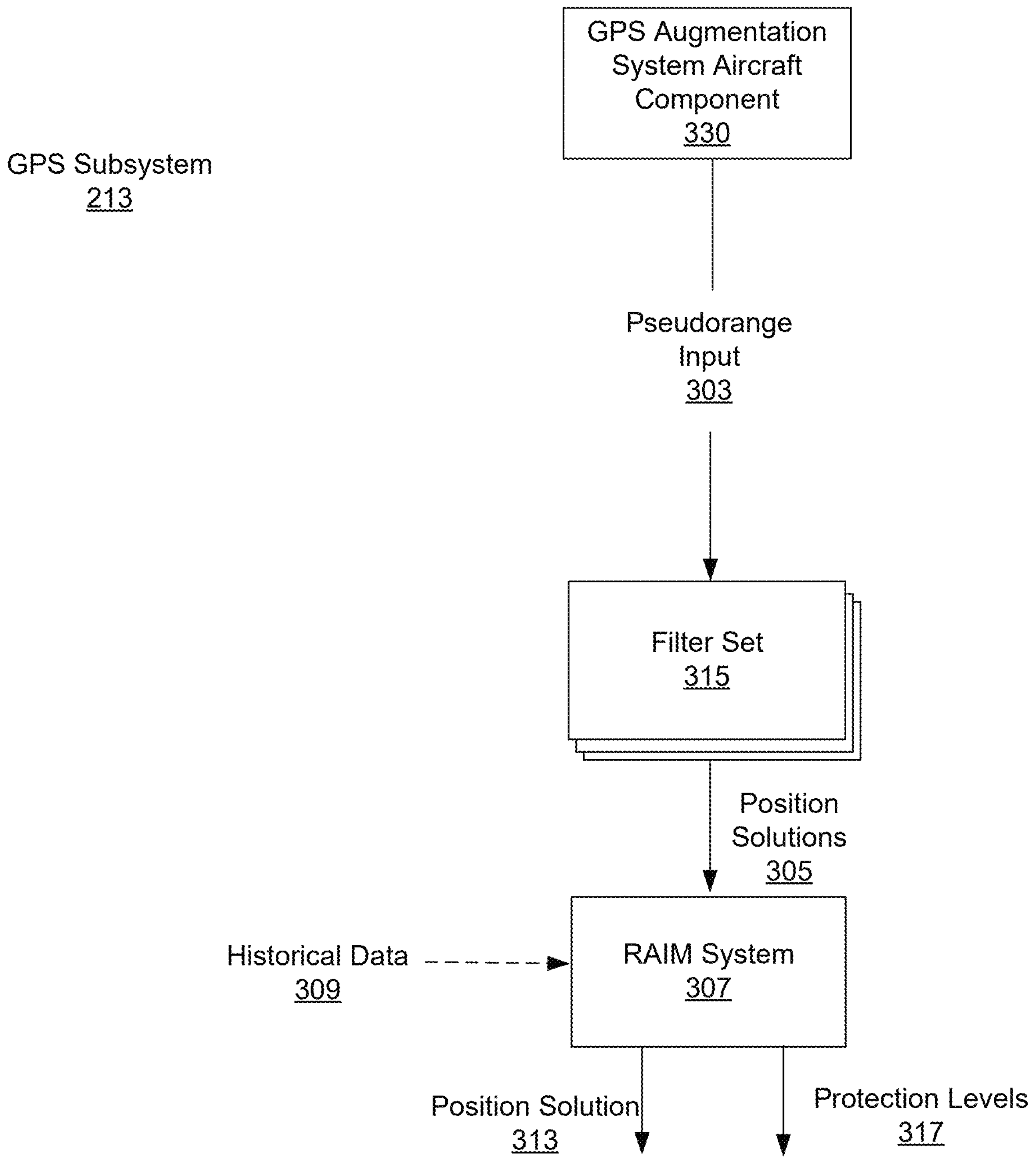
FIG. 3 is a block diagram illustrating a GPS that determines a position solution of an aircraft based on a statistical test that is selected from a plurality of different statistical tests depending on the current phase of flight of an aircraft, according to one embodiment.

FIG. 3 is a block diagram illustrating a GPS subsystem 213 that determines a position solution of the aircraft 205 using a statistical test that is selected from a plurality of different statistical tests depending on the current phase of flight of the aircraft 205. In one embodiment, the GPS subsystem 213 comprises a GPS augmentation system aircraft component 330, a filter set 315, and a RAIM system 307 that are onboard the aircraft 205. Although illustrated as the GPS subsystem 213 including the various components illustrated in the figure, in alternative embodiments, one or more components illustrated in the figure may be separate subsystems of the aircraft 205 that exchange data with the GPS subsystem 213. For example, the embodiments described herein may be implemented by the navigation processor 216 that includes inputs from other sensors, as described with respect to FIG. 2, and in doing so integrates GPS with the other sensors. Although described herein solely with reference to WAAS for clarity, the techniques put forth herein can be performed using a variety of augmentation systems (and potentially one or more additional systems), such as those described above with reference to FIG. 2.

In one embodiment, a GPS augmentation system aircraft component 330 receives satellite range measurements from a plurality of different GNSS satellites. The GPS augmentation system aircraft component 330 generates corrected pseudorange inputs 303 from the satellite range measurements received from the different satellites, and these corrected pseudorange inputs 303 are input to the filter set 315. Each corrected pseudorange input represents the distance between a corresponding GNSS satellite from the different GNSS satellites at the time of the emission of the signal and a receiver antenna on the aircraft 205 measured at the time of reception after being corrected for correlated errors by the parameters broadcast by the augmentation system.

In one embodiment, the filter set 315 receives the corrected pseudorange input 303 is input into the filter set 315 from the GPS augmentation system aircraft component 330 and generates a plurality of position solutions 305 of the aircraft 205 using the corrected pseudorange input 303. That is, the filter set 315 receives as inputs corrected pseudorange measurements from different satellites, and each filter in the filter set 315 outputs a corresponding position solution to the RAIM system 307. In one embodiment, the filter set 315 may be considered a set of position solution estimators. Examples of the type of filters included in the filter set 315 are parallel Extended Kalman Filters (EKFs), but alternative filters may be employed without departing from the principles set forth herein. Depending upon the embodiment, one or more of the Extended Kalman filters may be Schmidt Extended Kalman filters.

In one embodiment, the filter set 315 includes different filters that exclude different subsets of GPS satellites to accomplish position-domain solution separation. Although described herein solely with reference to single satellite faults, the techniques put forth herein can be performed to monitor for multiple satellite faults and/or combinations of satellite faults and faults in other sensors integrated into the position solution. In one embodiment, the GPS subsystem 213 monitors for all possible single-satellite faults, so for n satellites, there are a total of (n+1) filters in the filter set 315, n filters each with a different single satellite measurement not included in the filter (e.g., a drop-one filter), and a single filter with all measurements included in the filter (e.g., an all-in filter). For example, a drop-one filter i excludes GPS measurements from satellite i and never uses measurements from satellite i. In this way, the position solution generated by filter i is immune from any potential fault that only affects satellite i. In contrast, an all-in filter receives GPS measurements from all satellites i=1, 2, . . . , n.

The RAIM system 307 receives the position solutions 305 from the filter set 315 and applies FDE to the position solutions 305. In one embodiment, the RAIM system 307 determines the current phase of flight of the aircraft 205 and applies FDE to each position solution included in position solutions 305 using a statistical test that is selected from a plurality of different statistical tests based on the current phase of flight of the aircraft 205.

Generally, applying one of the statistical tests described herein to the candidate position solutions 305 results in the RAIM system 307 identifying valid position solutions and any invalid position solutions from the position solutions 305 (zero or more invalid position solutions). An invalid position solution is indicative of the satellite that provided the pseudorange measurement from which the invalid position solution was generated as potentially being faulty, for example. Accordingly, invalid position solutions are ignored in the determination of the position of the aircraft 205. In contrast, a valid position solution is indicative of all satellites that provided the pseudorange measurements from which the valid position solution was generated functioning normally (within specification). Thus, a valid position solution is used in the determination of the position of the aircraft 205.

In one embodiment, the RAIM system 307 selects a three-axis fault test (LVLH) which is performed using a single-axis statistical test applied to the position solutions 305 along the three-different axes (e.g., "along-track" axis, a "cross-track" axis, and a "vertical" axis) responsive to the RAIM system 307 determining that the aircraft 205 is in mostly straight or approach-like phase (e.g., the takeoff phase, approach phase, landing phase, rollout phase, and taxi phase) of flight. In the three-axis fault test, single-axis variances are calculated in the ENU frame by using $e_q=[100]^T$, $e_q=[010]^T$, and $e_q=[001]^T$ respectively, with the assumption that the covariance matrices are also derived in the ENU frame, where $e_q$ is a vector whose qth entry is 1 and all others are 0. Similarly, because the covariance matrices in the RAIM system 307 are derived in the LVLH frame, the same choices of $e_q$ provide variances in the along-track, cross-track, and vertical axes. The RAIM system 307 calculates a difference between the position solution of the all-in filter and the position solution of the drop-k position solution according to equation (1) below.

$$\Delta\hat{x}^{(k)} = \hat{x}^{(k)} - \hat{x}^{(0)} \tag{1}$$

In equation (1), $\Delta\hat{x}^{(k)}$ is the difference between the position solution of the all-in filter and the position solution of the drop-k position solution, $\hat{x}^{(k)}$ is the drop-k position solution provided by the drop-one filter k, and $\hat{x}^{(0)}$ is the all-in position solution provided by the all-in filter.

Regardless of whether the estimated solution is obtained using least squares with no prior information, or whether it is obtained as a result of recursive filtering, the position estimation error in equation (1) is upper bounded by a multivariate normal probability distribution with zero mean covariance matrix under nominal conditions (i.e., when no faults are present on one or more satellite measurements).

The statistical test performed per axis checks whether the observed estimation error difference along that axis is larger than a threshold. The threshold value is selected such that the probability of exceeding this value given the probability density function is less than an acceptable value. The test can then be expressed as the following equation (2):

$$prob\left(\left|\hat{x}_q^{(k)} - \hat{x}_q^{(0)}\right| \geq T_{single}\right) = \frac{P_{FA_q}}{N_{fault\_modes}} \tag{2}$$

In equation (2), $\hat{x}^{(k)}$ is the drop-k position solution of drop one filter-k, $\hat{x}^{(0)}$ is the all-in position solution of the all-in filter, $T_{single}$ is the threshold value, $P_{FA_q}$ is a continuity allocation to limit the probability of flight disruptions because of false alerts, and $N_{fault\_modes}$ is the maximum number of fault modes (e.g., large errors on individual satellites) to be monitored.

Given a univariate normal distribution with zero mean and standard deviation o, the threshold value $T_{single}$ can be calculated according to equation (3):

$$T_{single} = \sigma_{ss,q}^{(k)} Q^{-1}\left(\frac{P_{FA_q}}{2N_{fault\_modes}}\right) \tag{3}$$

Equation (3) represents the threshold that $\Delta\hat{x}^{(k)}$ from equation (1) is evaluated against. In equation (3), the threshold $T_{single}$ is a function of $$\sigma_{ss,q}^{(k)},$$

which is the bounding variance under nominal conditions of the difference between the drop-k position solution of the drop-one-filter k and the all-in position solution of the all-in filter, and $Q^{-1}$, which is the inverse of the tail density of the normal distribution with unit standard deviation, $P_{FA_q}$, and $N_{fault\_modes}$.

In one embodiment, the right side portion of equation (3), $$Q^{-1}\left(\frac{P_{FA_q}}{2N_{fault\_modes}}\right)$$

is represented by the variable $k_{fa,q}$ (e.g., a scaling factor) thereby resulting in the test ratio check in equation (4) shown below.

$$\frac{\left|\hat{x}_q^{(k)} - \hat{x}_q^{(0)}\right|}{k_{fa,q}\sigma_{ss,q}^{(k)}} \leq 1 \tag{4}$$

In equation (4), $\hat{x}^{(k)}$ is the drop-k position solution of drop-one-filter k, $\hat{x}^{(0)}$ is the all-in position solution of the all-in filter, and $$\sigma_{ss,q}^{(k)}$$

is a variance or the difference between the drop-k position solution of the drop-one-filter k and the all-in position solution of the all-in filter.

$$k_{fa,q}\sigma_{ss,q}^{(k)}$$

can be considered a scaled bounding standard deviation. In one embodiment, equation (4) is representative of the single-axis statistical test applied to one of the three LVLH axes during the mostly straight or approach-like phase of the aircraft 205 to determine the position solution of the aircraft 205, as will be further described below.

In one embodiment, the variance of the difference between the drop-k position solution of the drop-one-filter k and the all-in position solution of the all-in filter $$\sigma_{ss,q}^{(k)2}$$

is calculated based on equation (5) below.

$$\sum\nolimits_{ss,q}^{(k)2} = e_q^T\left(S^{(k)} - S^{(0)}\right)C_{acc}\left(S^{(k)} - S^{(0)}\right)^T e_q \tag{5}$$

In equation (5), $$e_q^T$$

is the transpose $e_q$, where $e_q$ is a vector whose qth entry is 1 and all others are 0, $S^{(k)}$ is the posterior covariance matrix of the least squares solution using the drop-k subset of satellites, $S^{(0)}$ is the posterior covariance matrix of the least squares solution of the all-in filter, and $C_{acc}$ is the nominal error model used for accuracy and continuity.

The terms of equation (5) are further defined as follows:

1. $C_{acc} \in \mathcal{R}^{n \times n}$ in equation (5) is defined as $$C_{acc}(i, i) = \sigma_{URE,i}^2 + \sigma_{tropo,i}^2 + \sigma_{user,i}^2$$

where $\sigma_{URE,i}$ is the bounding standard deviation of the clock and ephemeris error of satellite i used for accuracy and continuity calculations, $\sigma_{tropo,i}$ is the bounding standard deviation of tropospheric errors, and $\sigma_{user,i}$ is the bounding standard deviation of the signal-in-space error at the user.

2. $S^{(k)} \in \mathcal{R}^{4\times4}$ is the posterior covariance matrix of the least squares solution using a subset of satellites and is defined as $S^{(k)}=(G^TW^{(k)}G)^{-1}G^TW^{(k)}$.
3. $W^{(k)} \in \mathcal{R}^{4\times4}$ is the weighting matrix, calculated according to equation (6) as shown below.

$$W^{(k)}(i, i) = C_{int}^{-1}(i, i) \text{ if } i \text{ is in } idx_k \tag{6}$$
$$W^{(k)}(i, i) = 0 \text{ otherwise}$$

In equation (6), $W^{(k)}$ is the weight matrix of the drop-k subset of satellites, and $C_{int}$ is the nominal error model used for integrity calculations.

4. $G \in \mathcal{R}^{(n\times4)}$ is the measurement matrix defining the relationship between range measurements and the position solution.
5.

$$C_{int} \in \mathcal{R}^{n\times n} \text{ is } C_{int}(i, i) = \sigma_{URA,i}^2 + \sigma_{tropo,i}^2 + \sigma_{user,i}^2$$

where $\sigma_{URA,i}$ is the bounding standard deviation of the clock and ephemeris error of satellite i used for integrity, $\sigma_{tropo,i}$ is the bounding standard deviation of tropospheric errors, and $\sigma_{user,i}$ is the bounding standard deviation of the signal-in-space error at the user.

6. q is used to denote the direction of the axes. For example, when q=[100], the variance in the first axis is calculated. If the ENU frame of reference is used, this corresponds to the East direction, and if the LVLH frame is used, this corresponds to the along-track direction.
7. In one embodiment, $C_{acc}$ and $C_{int}$ are approximately equal, with both $\sigma_{URA,i}$ and $\sigma_{URE,i}$ being equivalent to $\sigma_{flt}$, which is the bounding standard deviation of fast/long term correction residual. In another embodiment, $\sigma_{URA,i}$ and $\sigma_{URE,i}$ are not equivalent because $\sigma_{URA,i}$ is a standard deviation that represents a bound for integrity, whereas $\sigma_{URE,i}$ is a standard deviation that is a lesser bound that covers typical errors.
8. $\sigma_{user,i}$ is approximately equal to $\sigma_{air}$, which is the standard deviation of airborne receiver errors.
9. When using a single-frequency receiver, an addition term including $\sigma_{UIRE}^2$ is needed to account for the increased uncertainty due to residual ionospheric delay error after corrections are applied. With a dual-frequency receiver, this error can be estimated and removed at the cost of increasing $\sigma_{URA,i}$ and $\sigma_{URE,i}$.

Given the foregoing assumptions, $C_{acc}$ and $C_{int}$ are both equal to the measurement matrix denoted by $R \in \mathcal{R}^{n\times n}$ and represented by equation (7) shown below.

$$R = \text{diag}(r_1, r_2, \ldots, r_n) \tag{7}$$

In equation (7), $r_1, r_2, \ldots r_n$ are the diagonal elements of the matrix R.

Using equation (7) in equation (6), the definition of $W^{(k)}$ reduces to equation (8) shown below.

$$W^{(k)}(i, i) = 1/r_i \text{ if } i \text{ is in } idx_k \qquad (8)$$
$$W^{(k)}(i, i) = 0 \text{ otherwise}$$

In equation (8), $W^{(k)}$ is the weight matrix of the drop-k subset of satellites.

The matrix product in equation (5) is equal to the difference between the uncertainty covariance matrix of the $k^{th}$ solution and the uncertainty covariance matrix of the all-in solution according to equation (9) shown below.

$$(S^{(k)} - S^{(0)})R(S^{(k)} - S^{(0)})^T = (G^T W^{(k)} G)^{-1} - (G^T W^{(0)} G)^{-1} \qquad (9)$$

In equation (9), $S^{(k)}$ is the posterior covariance matrix of the least squares solution using the drop-k subset of satellites, $S^{(0)}$ the posterior covariance matrix of the least squares solution of the all-in filter, G is the measurement matrix, $W^{(k)}$ is the weight matrix of the drop-k subset of satellites, and $W^{(0)}$ is the weight matrix of the all-in filter.

This relationship is extended to the use of posterior covariances from a Kalman filter and is rewritten in equation (10) shown below.

$$\sigma_{ss,q}^{(k)2} = e_q^T (P^{(k)} - P^{(0)}) e_q \qquad (10)$$

In equation (10), $$e_q^T$$

is a vector whose qth entry is 1 and all others are 0, $P^{(k)}$ are position estimation error uncertainty covariance matrices from a drop-k filter, and $P^{(0)}$ are position estimation error uncertainty covariance matrices from an all-in filter. A restriction is applied in that these two covariance matrices are obtained using identical filtering techniques which process and measurement uncertainty noise models and result in the difference being positive semidefinite according to equation (11) shown below.

$$P^{(k)} - P^{(0)} \geq 0 \qquad (11)$$

Thus, $$\sigma_{ss,q}^{(k)2}$$

in equation (10) can be used for any single axis for any choice of coordinate frame.

In one embodiment, the RAIM system 307 calculates a test ratio value for each drop-k position solution included in the position solutions 305 according to equation (4) described above. The numerator of equation (4) is the absolute value of the difference in position solutions between the drop-k filter and the all-in filter. The denominator is the single-axis test threshold values according to equation (3). Responsive to the ratio value for the drop-k position solution being less than or equal to one, the RAIM system 307 determines that the drop-k position is a valid position solution. As a result, INS 220 includes the valid position solution in the determination of the position solution of the aircraft during the mostly straight phase or approach-like phase of the aircraft 205.

Responsive to the ratio value for the drop-k position solution being greater than one, the RAIM system 307 determines that the drop-k position solution is an invalid position solution. Thus, the satellite that is excluded from the filter that generated the drop-k position is considered to be faulty. As a result, the RAIM system 307 excludes the invalid position solution in the determination of the position solution of the aircraft during the takeoff, approach, landing, rollout, and taxi phases of the aircraft 205.

The RAIM system 307 outputs a position solution 313 based on the one or more valid position solutions that are determined based on the ratio test. In one embodiment, the all-in position solution is selected as the position solution for the aircraft 205 responsive to all position solutions 305 being determined to be valid. The all-in position solution is selected because the all-in position solution has the lowest standard deviation of error due to having the most satellites and therefore the best satellite geometry. However, a valid drop-k position solution is selected as the position solution of the aircraft 205 responsive to all remaining drop-k position solutions being determined to be invalid. In another example, the determination of the position solution of the aircraft 205 is aborted responsive to not being able to determine which of the drop-k position solutions is valid. Unless an abort occurs, the aircraft 205 may then perform an aircraft operation during the mostly straight phase (e.g., takeoff, approach, landing, rollout, and taxi operation) of the aircraft 205 based on the position solution 313 output by the RAIM system 307.

During the turning phase (e.g., climb, cruise, and descent phases) of the aircraft 205, the RAIM system 307 applies a different statistical test to the position solutions 305 than the three-axis test performing a single-axis statistical test individually along all thee axes applied during the mostly straight or approach-like phase (e.g., takeoff, approach, landing, rollout, and taxi phases) of flight, as described above. In one embodiment, the RAIM system 307 selects a horizontal-plane statistical test to apply to the position solutions 305 responsive to the RAIM system 307 determining that the aircraft 205 is in the turning phase (e.g., climb, cruise, or descent phase) of flight. The horizontal-plane statistical test combines FDE in the along-track axis and cross-track axis into a single calculation. By combining the along-track axis and cross-track axis into a single calculation, errors that would otherwise occur during the frequent maneuvers during the turning phase (e.g., a climb, cruise, or descent phase) of flight are reduced.

In one embodiment, the horizontal-plane statistical test is a modification of the single-axis statistical test described above. In the single-axis statistical test, the RAIM system 307 compares the position solutions along a single axis. However, in the horizontal-plane statistical test, the RAIM system 307 calculates the position differences along two different horizontal axes that are orthogonal to each other according to equation (12) shown below.

$$\begin{bmatrix} \Delta\hat{x}_1^{(k)} \\ \Delta\hat{x}_2^{(k)} \end{bmatrix} = \begin{bmatrix} \hat{x}_1^{(k)} - \hat{x}_1^{(0)} \\ \hat{x}_2^{(k)} - \hat{x}_2^{(0)} \end{bmatrix} \quad (12)$$

In equation (12), $$\Delta\hat{x}_1^{(k)}$$

is the difference between the all-in position solution and the drop-k position solutions along a first axis, where $$\hat{x}_1^{(0)}$$

is the all-in position solution along the first axis and $$\hat{x}_1^{(k)}$$

is the drop-k position solution along the first axis. In equation (12), $$\Delta\hat{x}_2^{(k)}$$

is the difference between the all-in position solution and the drop-k position solutions along a second axis that is orthogonal to the first axis, where $$\hat{x}_2^{(0)}$$

is the all-in position solution along the second axis and $$\hat{x}_2^{(k)}$$

is the drop-k position solution along the second axis. Under nominal conditions, the errors along the two horizontal axes are upper bounded by a bivariate normal distribution with a mean equal to zero and a standard deviation given by the top left 2×2 block of the difference in position covariance matrices in equation (10). In one embodiment, the 2×2 covariance matrix is denoted by a difference position estimation error ΔP defined by equation (13) shown below.

$$\Delta P = \begin{bmatrix} \sigma_a^2 & \sigma_{ac} \\ \sigma_{ac} & \sigma_c^2 \end{bmatrix} \quad (13)$$

In equation (13), $$\sigma_a^2$$

is the along-track variance, $\sigma_{ac}$ is along/cross-track covariance, and $$\sigma_c^2$$

is the cross-track variance,

The single-axis fault detection test in equation (2) described above is then modified for the two horizontal axes in equation (14) shown below.

$$\text{prob}\left(\sqrt{\Delta\hat{x}_1^{(k)} + \Delta\hat{x}_2^{(k)}} \geq T_{horizontal}\right) = \frac{P_{FA_{horizontal}}}{N_{fault\_modes}} \Rightarrow \text{prob}\left(\sqrt{\Delta\hat{x}_1^{(k)} + \Delta\hat{x}_2^{(k)}} \leq T_{horizontal}\right) = 1 - \frac{P_{FA_{horizontal}}}{N_{fault\_modes}} \quad (14)$$

In equation (14), $$\Delta\hat{x}_1^{(k)}$$

is the difference between the all-in position solution and the kth drop-k position solution along the first axis (e.g., along-track) and $$\Delta\hat{x}_2^{(k)}$$

is the difference between the all-in position solution and the $k^{th}$ drop-k position solution along the second axis (e.g., cross-track), $P_{FA_q}$ is a continuity allocation to limit the probability of flight disruptions because of false alerts, and $N_{fault\_modes}$ is the maximum number of fault modes (e.g., large errors on individual satellites) to be monitored.

Figure 7:
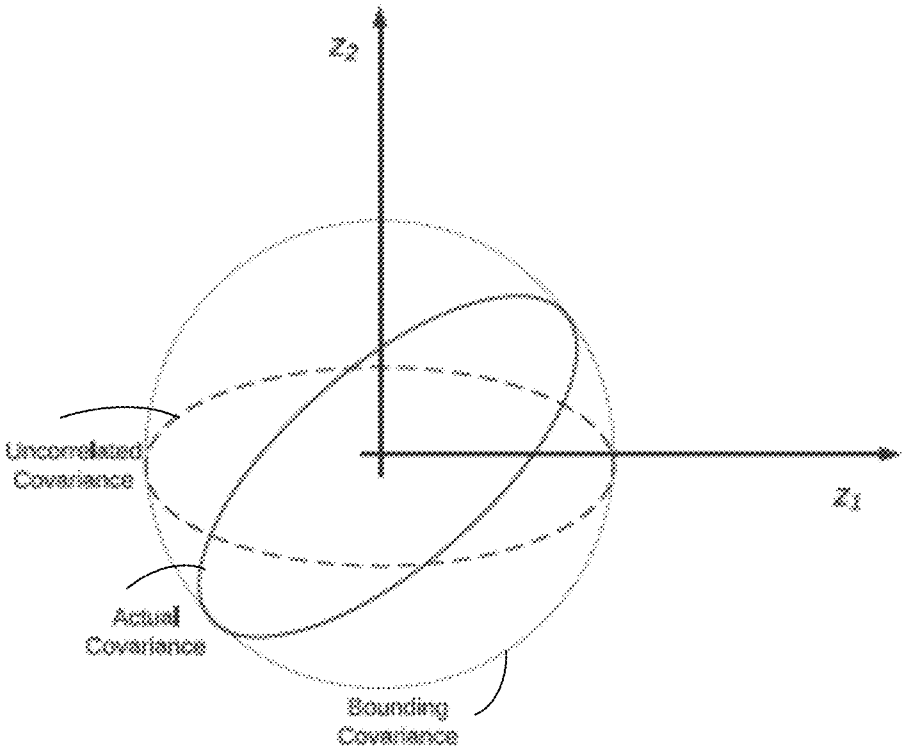
FIG. 7 is a diagram illustrating a bounding confidence ellipse, according to one embodiment.

Computation of the threshold for the horizontal axis test is difficult due to the cumulative density function generally not having a closed-form solution for the 2-norm of a random vector. The general 2D uncertainty covariance can be bounded by an uncorrelated distribution with equal variances along each axis. It is given by the semimajor axis of the rotated ellipse in FIG. 7. This bounding variance is given by the following expression inequation (15) shown below.

$$\sigma_{ss,horizontal}^{(k)2} = \frac{1}{2}(\sigma_a^2 + \sigma_c^2) + \sqrt{\frac{1}{4}(\sigma_a^2 - \sigma_c^2)^2 + \sigma_{ac}^2} \quad (15)$$

In equation (15), $$\sigma_{ss,horizontal}^{(k)2}$$

is the variance of the difference in estimated solution between a drop-one filter and all-in filter in the horizontal plane, $$\sigma_a^2$$

is the along-track variance, $\sigma_{ac}$ is along/cross-track covariance, and $$\sigma_c^2$$

is the cross-track vallance.

The covariance matrix in equation (13) is then approximated as, $$\Delta P' = \sigma_{ss,horizontal}^{(k)2} I_{2\times 2}$$

and the quadratic form on the random variables simplifies to the special case of a Rayleigh distribution with parameter $$\sigma = \sigma_{ss,horizontal}^{(k)}.$$

The Kayleigh distribution cumulative density function (CDF) is defined in equation (16) shown below.

$$cdf(x) = 1 - \exp\left(-\frac{x^2}{2\sigma^2}\right),\ x \ge 0 \tag{16}$$

In equation (16), x is the value at which the CDF is evaluated, and o is the scale parameter of the distribution.

Using the $$\sigma_{ss,horizontal}^{(k)2}$$

computed in equation (15) and the Rayleigh distribution cumulative density function in equation (16) with a probability of exceedance equal to $$\frac{P_{FA_{horizontal}}}{N_{fault\_modes}}$$

results in equation (17) shown below that is used to compute the second threshold $T_{horizontal}$ for the horizontal-plane statistical test.

$$1 - \exp\left(-\frac{T^2}{2\sigma^2}\right) = 1 - \frac{P_{FA_{horizontal}}}{N_{fault\_modes}} \Rightarrow T_{horizontal} = \sigma_{ss,horizontal}^{(k)} \sqrt{-2\log\left(\frac{P_{FA_{horizontal}}}{N_{fault\_modes}}\right)} \tag{17}$$

In equation (17), the threshold $T_{horizontal}$ for the horizontal-plane statistical test is based on $$\sigma_{ss,horizontal}^{(k)},$$

which is the variance of the difference in estimated solution between a drop-one filter and all-in filter in the horizontal plane, $P_{FA_q}$, is a continuity allocation to limit the probability of flight disruptions because of false alerts, and $N_{fault\_modes}$ is the maximum number of fault modes (e.g., large errors on individual satellites) to be monitored In one embodiment, the term $$\sqrt{-2\log\left(\frac{P_{FA_{horizontal}}}{N_{fault\_modes}}\right)}$$

is considered to be a scaling factor.

FDE in the horizontal-plane can be checked using the horizontal-plane statistical test defined by equation (18) shown below.

$$\sqrt{\Delta\hat{x}_1^{(k)} + \Delta\hat{x}_2^{(k)}} \le T_{horizontal} \tag{18}$$

In one embodiment, the RAIM system 307 performs the fault check in the horizontal plane according to equation (18) to determine the position solution of the aircraft 205 during the cruise phase of flight of the aircraft 205. The RAIM system 307 compares the calculated value in equation (18) to the horizontal-plane threshold $T_{horizontal}$ defined in equation (17). Responsive to the value being less than or equal to the threshold value, $T_{horizontal}$, the RAIM system 307 determines that the drop-k position is a valid position solution. As a result, RAIM system 307 includes the valid position solution in the determination of the position solution of the aircraft 205 during the climb, cruise, or descent phase of the aircraft 205. Responsive to the value being greater than the second threshold value $T_{horizontal}$, the RAIM system 307 determines that the drop-k position solution is an invalid position solution. Thus, the satellite that is excluded from the filter that generated the drop-k position is faulty, for example. As a result, RAIM system 307 excludes the invalid position solution in the determination of the position solution of the aircraft during the turning phase or cruise-like phase (e.g., climb, cruise, or descent phase) of the aircraft 205.

The RAIM system 307 outputs a position solution 313 based on the one or more valid position solutions that are determined based on the comparison of each value to the threshold value $T_{horizontal}$ in equation (18) during the turning phase or cruise-like phase (e.g., climb, cruise, or descent phase) of the aircraft 205. In one embodiment, the all-in position solution from the all-in filter is selected as the position solution for the aircraft 205 responsive to all position solutions 305 being determined to be valid. The all-in position solution is selected because the all-in position solution has the lowest standard deviation of error due to having the most satellites and therefore the best satellite geometry. However, a valid drop-k position solution is selected as the position solution of the aircraft 205 responsive to all remaining drop-k position solutions being determined to be invalid. In another example, the determination of the position solution of the aircraft 205 is aborted responsive to not being able to determine which of the drop-k position solutions is valid. Unless an abort occurs, the aircraft 205 may then perform an aircraft operation during the climb, cruise, or descent phase of the aircraft 205 based on the position solution 313 output by the RAIM system 307.

In one embodiment, the RAIM system 307 may also output protection levels 317 that correspond to the position solution 313 in each of the phases of flight of the aircraft 205. A RAIM system 307 uses the position solution 313 to generate protection levels 317 and to monitor position solution integrity. The RAIM system 307 may also incorporate historical data 309, such as historical error data corresponding to the GPS augmentation system aircraft component 330, in calculating thresholds and protection levels.

As described above, the GPS subsystem 213 that applies different statistical tests to position solutions based on the current phase of flight of the aircraft 205 is onboard the aircraft 205. By utilizing the onboard GPS subsystem 213, latency in the calculation of the position solution of the aircraft 205 is reduced. However, in other embodiments, the techniques described herein for determining the position solution 313 of the aircraft 205 using the different statistical tests may be performed at the remote station 220 that provides the position solution to the aircraft 205.

Techniques described herein can provide for protection levels that are smaller than typical WAAS protection levels while maintaining the $10^{-7}$ integrity that WAAS achieves. With reduced protection levels, lower approach minima are enabled, and with the addition of radar altimeter measurements, automatic takeoff and landing operations can be performed. Currently, the lowest allowable approach minimum (decision height) for a WAAS user is 200 ft. In an embodiment, the filter set 315 uses only WAAS-corrected pseudorange inputs 303. These WAAS-corrected GPS pseudoranges are obtained from a minimum operational performance standard (MOPS)-compliant GPS-WAAS receiver.

In one embodiment, the position solution 313 has an associated covariance which is used for computing protection levels. This covariance is a function of the bounding variance on each pseudorange (derived from WAAS and local error bounds), the bounding variance of the INS measurements, and the satellite geometry, which informs the measurement noise matrix, $R_k$, in each of the filters.

The standard Kalman filter formulation assumes that the measurement noise matrix, $R_k$, is zero-mean white noise. However, the residual errors following the application of WAAS corrections violate this assumption, as they are strongly correlated over time. The correlation times for atmospheric errors, $\tau_{atm}$, (assuming, for simplicity, a first-order Gauss-Markov model) are typically on the order of 15 minutes to 1 hour, while the correlation times of residual satellite clock and ephemeris errors, $\tau_{flt}$, are similar. The correlation time for the user range error, $\tau_{air}$, is roughly 100 seconds, as it is driven by the user smoothing time constant, which exceeds the time correlation of multipath errors for moving aircraft.

One way to account for correlation in the measurement errors is to scale the measurement noise matrix by the ratio of correlation time to measurement update interval. Despite the long correlation times of WAAS residual errors, significant benefit from averaging these errors within the filter will result if the filters are run throughout flights of 1 hour or more. However, if the filters are initialized or re-initialized several minutes before a critical operation such as the beginning of a takeoff or an approach and landing phase, this benefit would be minimal. In these cases, a simpler approach to modelling the long-time-correlated atmospheric and fast-and-long-term errors would be to treat them as biases for the duration of approach and landing.

This can be further improved by accounting for these errors using a Schmidt Kalman filter. These filters are sometimes referred to as "consider state" filters and account for these errors by treating them as unobservable states that nevertheless contribute to the filter covariance.

The four time-correlated range errors considered are (1) fast and long term correction residuals ($e_{flt}$), (2) ionospheric delay ($e_{iono}$), (3) airborne receiver errors ($e_{air}$), and (4) tropospheric errors ($e_{tropo}$). As explained above, the tightly-coupled INS-GPS filter set 315 incorporates GPS measurements at the pseudorange level (following the application of corrections from WAAS corrections or other augmentation systems). The pseudorange equation with these errors included is:

$$\rho i = \sqrt{(xi - x)^2 + (yi - y)^2 + (zi - z)^2} + b + e_{flt,i} + e_{iono,i} + e_{air,i} + e_{tropo,i} + \varepsilon_i$$

where $\rho_i$ is the pseudorange to the $i^{th}$ satellite, b is the user clock error, and $\varepsilon_i$ contains all other errors. These states cannot be estimated since they are individually indistinguishable from each other. If the four errors listed here were not correlated in time, they could simply be accounted for in the measurement noise covariance matrix of a normal EKF. Since they are, they are accounted for by incorporating them as consider states.

In an embodiment, in order to include all possibly usable GPS satellites in filter processing, the aircraft 205 simultaneously runs a number of filter instances equal to the number of satellites in the augmented satellite system aircraft component's 330 constellation (e.g., 32) plus one. All but one of the filters in the filter set 315 are each associated with a particular satellite from the constellation, and excludes its associated satellite's data, while the last filter uses data from all satellites in the constellation.

Typically, only a smaller number of satellites will be or will have recently been in view of a particular user, so only the filters corresponding to those satellites will significantly differ from the filter including all satellite data. Those filters corresponding to satellites not recently in view will "exclude" an unused satellite and thereby appear very similar to the "all-satellites-healthy" filter.

By running all of these filters at once, filtering can be initialized at or before the beginning of each flight and be continued throughout the flight, including the approach and landing phase. This maximizes the benefit of filtering by averaging over long time scales and thus reducing slowly-changing GPS errors after WAAS corrections are applied. However, in order to prevent the effects of past measurement failures from lingering too long in filter "memory," in some embodiments, these filters are re-initialized periodically during the flight (e.g., once per hour), which lessens the benefit obtained from averaging. In addition, the need to continually maintain more than 30 filters can be a significant computational demand on the aircraft, e.g., on the GPS subsystem 213.

An alternative embodiment is to give up most of the benefit of averaging slowly-changing errors and instead only initialize the filters shortly before the approach phase begins. In this case, only a smaller number of filters (e.g., about 12 to 18) are used, to include all satellites in view at the start of initialization and any others that may come into view during the approach. As noted previously, in this alternative, the slowly-changing WAAS residual errors that would ordinarily be included in the measurement covariance matrix Rx are simply be treated as biases and added directly to the filter state covariance matrix Pk. In another alternative, these biases are modeled as "consider states" and treated appropriately regardless of when the filters are initialized. This allows the bias to be used regardless of the filter initialization procedure.

In one embodiment, these subset filter formulations only consider a single satellite being faulty, where the probability of two or more independent satellite faults being present at the same time (or a correlated constellation fault being present) is well below the $10^{-7}$ integrity risk allocation and has a sub-allocated integrity risk of less than $10^{-8}$.

In various embodiments, satellites that newly rise into view of the aircraft 205 are de-weighted by their initial subset filter covariance matrix and contribute more to the position solution as their covariance converges toward steady state. Satellites that are lost from view and re-acquired have their subset filters re-initialized in a similar fashion, but if the outage is short, the initial covariance matrix of a re-acquired satellite is a function of the covariance before the dropout. Depending on the duration of the outage, this initial covariance will be larger than the pre-dropout covariance but smaller than that of a satellite newly risen into view.

Satellites that are excluded by the aircraft 205 (or by WAAS UDRE or GIVE indicators) are treated differently because they are at that point presumed to be faulted until proven otherwise. An excluded satellite can be re-admitted by passing a check at a later time (e.g., after having its filter re-initialized and re-converged). Satellites whose exclusion is triggered by WAAS are re-admitted when updated WAAS UDRE and GIVE messages allow their use and the re-admittance threshold is passed. Note that satellites excluded after the approach and landing phase has begun are unlikely to be re-admitted before it ends.

As described above, the aircraft 205 attempts to exclude faulty measurements, such as measurements causing error to exceed an alert limit. As such, not only the WAAS system, but also the RAIM system 307 of the aircraft (e.g., the GPS subsystem 213), can trigger a satellite exclusion. This represents a presumed fault which can be recovered (i.e., re-admitted for use) as described below.

In an embodiment, while the filters propagate position and velocity states at a fast update rate (e.g., 50 Hz), WAAS-corrected GPS measurements are introduced into the filters at a slower rate (e.g., 5 Hz). WAAS receiver algorithms propagate corrections from the times that they are received to the time that measurements are made and check that this interval is not too large. Filter measurement updates are synchronized to the WAAS receiver time tags to avoid the need for any additional latency adjustments by the filters. In some embodiments, protection level calculations can be carried out separately along separate axes, e.g., along-track and cross-track, as described above with reference to FIG. 1C.

A satellite k excluded by the aircraft can be re-admitted for use in positioning after its filter has been re-initialized and re-converged. For re-admission, a detection test must be passed for that satellite, but the threshold that applies is not the normal one (e.g., 1.0) but instead a much tighter one (e.g., 0.3). A tighter threshold applies due to the fact that a satellite previously excluded as faulted is deemed faulted with a prior probability approaching 1.0 until it is re-admitted. Therefore, to obtain the same level of integrity on that satellite as one that has not been excluded (and thus has a low prior fault probability), the implied missed-detection probability of the detection test must be much lower as well. This is achieved (at the expense of a higher probability of false rejection) by the tighter threshold ratio.

The requirement on the time to alert (TTA) for GBAS approaches with minima under 200 ft (Category II/III) is 2 seconds. The WAAS TTA is 6 seconds, meaning that WAAS alone may not alert the user soon enough of an error for these approaches. Because the filters are run on the aircraft 205 with updates faster than once per second, it can alert a rapidly growing fault in less than 2 seconds, enabling the aircraft 205 to meet the TTA requirements for approaches below 200 ft.

Certain slowly growing faults, such as very slow clock run-offs, may only be detectable by WAAS. In this case, WAAS would not be able to detect these faults until at least 6 seconds after they become hazardous, but the very low probability of these faults and their very slow growth rate would make them a non-factor over the relatively short time frame of an approach. While it is theoretically possible for a slow-growing fault to become hazardous to an automated landing and not be detected and excluded by WAAS within 2 seconds, the probability of such an event is well below the $10^{-7}$ integrity risk requirement. In contrast, faster growing faults that become hazardous very quickly are more likely and potentially problematic during an approach and landing, but these would be detected in less than 2 seconds.

Historical WAAS performance data 309, e.g., error data, can be factored by the aircraft 205 into protection level calculations. The standard deviations in the position domain are driven by the WAAS range-domain error standard deviations applied to each pseudorange within the measurement update in the filter set 315. The RAIM system 307 is designed with knowledge of the maximum ratio of observed error to computed protection level over a large prior set of observed error values. This ratio, or a value proportional to this ratio, is used to scale the protection level calculations.

In the two horizontal directions (along-track and cross-track), the improved protection levels support the entire approach, landing, and rollout. In the vertical direction, the improved protection levels support lower minima than the currently accepted 200 ft decision height for an LPV-200 approach. This system may support 100 ft decision heights. At 150 ft, additional input 306, e.g., radar altimeter measurements, can be phased into the filters of filter set 315. Under 100 ft Height Above Touchdown (HAT), radar altimeter measurements will enhance vertical navigation accuracy, further reduce VPLs, and allow for automated landings. The radar altimeter provides aircraft 205 height above ground level, which is compared to a terrain map that provides the height of the terrain as a function of latitude and longitude relative to the WGS-84 ellipsoid, which allows for the radar altimeter measurements to be converted to altitude above the ellipsoid, then into Earth Centered Earth Fixed (ECEF) or East-North-Up (ENU) coordinates. In an embodiment, terrain maps are obtained from surveys of airport runway areas and pre-threshold domains.

In the filter set 315, radar altimeter measurements can be added as a virtual pseudorange measurement with a component only in the vertical direction and a zero clock term. This addition to the filter is implemented in the observation matrix, $H_n$, where the bottom row is augmented to include the radar measurement. A radar altimeter measurement has a variance that is a function of the uncertainty of the radar altimeter and the accuracy of the terrain map. In an embodiment, this value is scaled such that zero-mean Gaussian extrapolations of radar altimeter errors can be shown to bound actual radar altimeter errors at the very low probabilities reflected by the protection levels.

Figure 4:
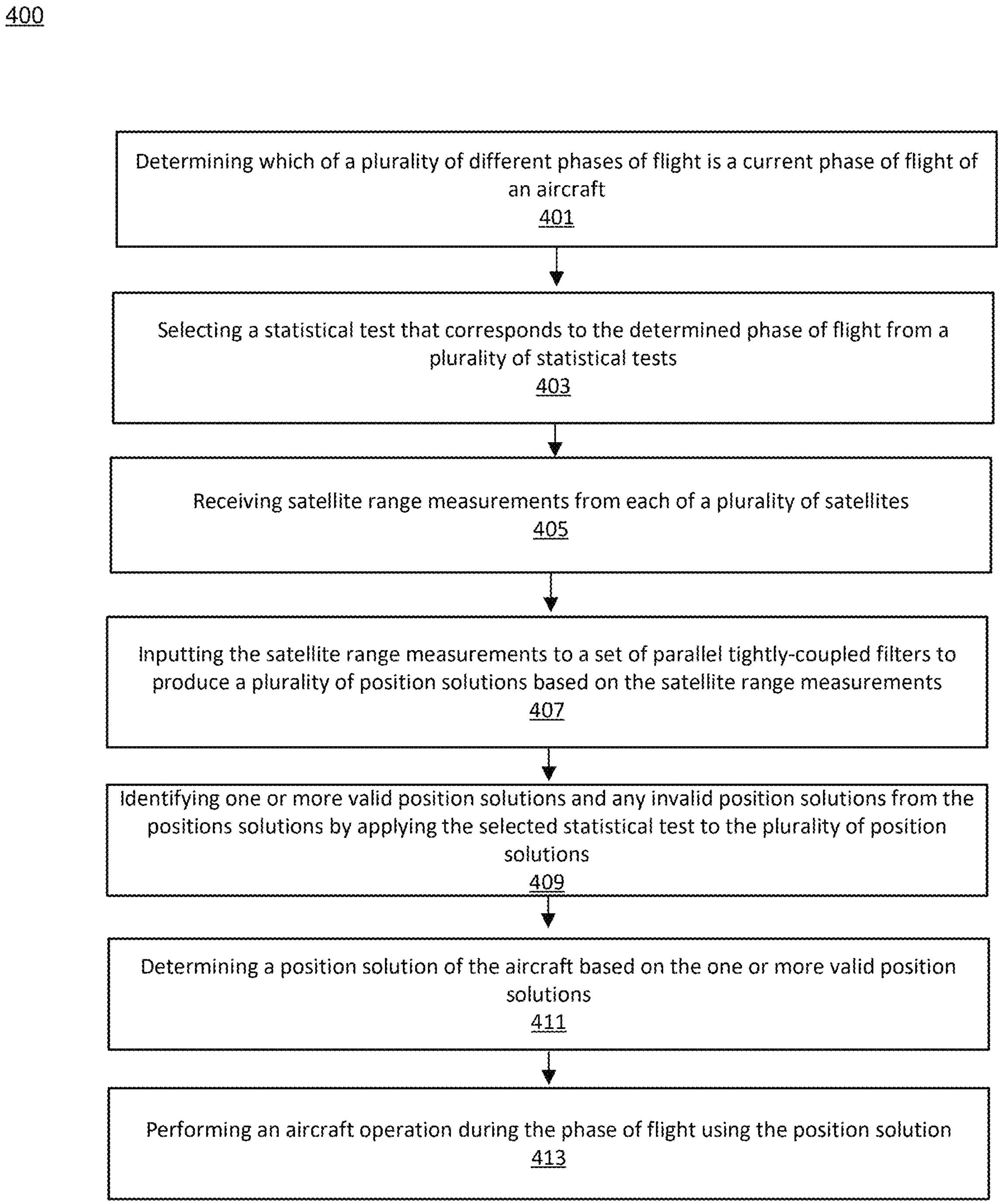
FIG. 4 is a flowchart illustrating a process for selecting a statistical test used to determine the position solution of the aircraft based on the current phase of flight of the aircraft.

III. Methods for Determining Position Solution 3.1 Method for Selecting Statistical Test Based on Current Phase of Flight the Aircraft FIG. 4 is a flowchart illustrating a process 400 for selecting a statistical test used to determine the position solution of the aircraft 205 based on the current phase of flight of the aircraft 205. The process can be implemented by one or more embodiments of the system 200 described above.

The GPS subsystem 213 of the aircraft 205 determines 401 which of a plurality of different phases of flight is a current phase of flight of the aircraft 205. The GPS subsystem 213 selects 403 a statistical test that corresponds to the determined phase of flight from a plurality of statistical tests. In one embodiment, each of the plurality of statistical tests corresponds to one or more of the plurality of different phases of flight. For example, the GPS subsystem 213 selects the single-axis statistical test to apply to each position solution for each of the different LVLH axes responsive to the aircraft 205 being in the mostly straight phase (e.g., approach like phase) which includes the takeoff phase, approach phase, landing phase, rollout phase, and taxi phase of the aircraft 205. In another example, the GPS subsystem 213 selects the horizontal-plane statistical test to apply to each position solution responsive to the aircraft 205 being in the turning phase (e.g., cruise-like phase) which includes the climb phase, the cruise phase, and the descent phase of the aircraft 205.

The GPS subsystem 213 receives 405 satellite range measurements from each of a plurality of satellites of a GPS augmentation system during the determined phase of the aircraft 205. The GPS subsystem 213 inputs 407 the satellite range measurements into a set of parallel tightly-coupled filters to produce a plurality of position solutions based on the satellite range measurements. Examples of the filters include a set of parallel extended Kalman filters (in one set of embodiments, Schmidt Extended Kalman Filters). Each filter in the set of filters outputs a corresponding position solution for the aircraft 205.

The GPS subsystem 213 identifies 409 from the position solutions one or more valid position solutions and any invalid position solutions by applying the selected statistical test to the plurality of position solutions output by the set of filters. The GPS subsystem 213 determines 411 a position solution of the aircraft 205 based on the valid position solutions and excludes the invalid position solutions. The aircraft 205 may perform 413 an aircraft operation during the phase of flight using the position solution. For example, the aircraft 205 may perform an aircraft takeoff, approach, landing, rollout, or taxi operation using the position solution if the determined phase of flight is the mostly straight or approach-like phase of flight, whereas the aircraft 205 may perform a turning operation, climb operation, cruise operation, or descent operation if the determined phase of flight is the turning phase of the aircraft 205.

3.2 Method for Takeoff, Approach, Landing, Rollout, and Taxi Operations

Figure 5:
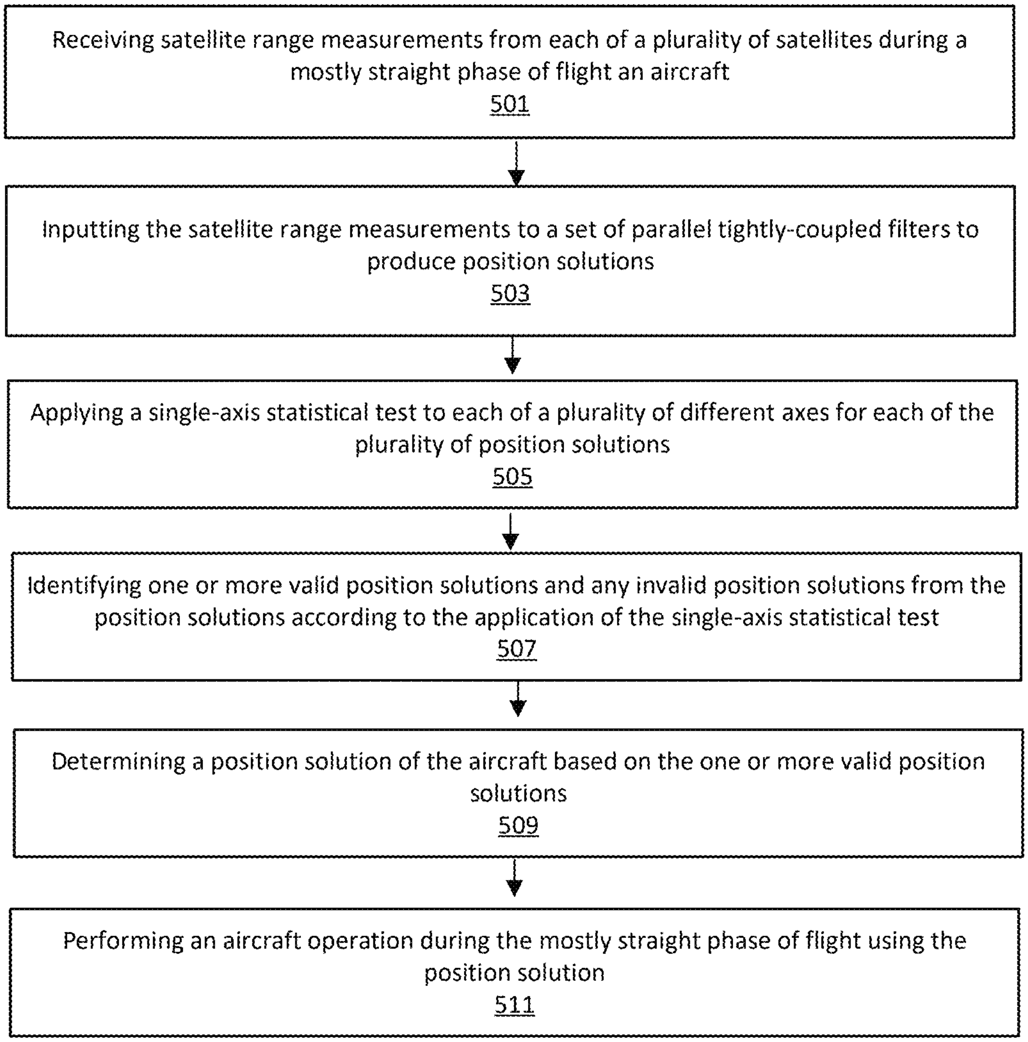
FIG. 5 is a flowchart illustrating a process for an aircraft takeoff, approach, landing, rollout, or taxi operation during a mostly straight phase or approach-like phase of the aircraft using a position solution that is selected using a three-axis test, where three single-axis statistical test are applied across all three LVLH axes, according to one embodiment.

FIG. 5 is a flowchart illustrating a process 500 for performing an aircraft takeoff, approach, landing, rollout, or taxi operation during a mostly straight phase or approach-like phase of the aircraft 205 using a position solution that is selected using a three-axis test, where three single-axis statistical tests are applied across all three LVLH axes. The process 500 can be implemented by one or more embodiments of the system 200 described above. A GPS subsystem 213 receives 501 satellite range measurements from each of a plurality of satellites of a GPS augmentation system during the mostly straight phase or approach-like phase that includes a takeoff, approach, landing, rollout, or taxi phase of the aircraft 205. The GPS subsystem 213 inputs 503 the satellite range measurements into a set of parallel tightly-coupled filters to produce a plurality of position solutions. Examples of the filters include a set of parallel extended Kalman filters (in one set of embodiments, Schmidt Extended Kalman Filters). Each filter in the set of filters outputs a corresponding position solution for the aircraft 205.

During the mostly straight phase (e.g., takeoff, approach, landing, rollout, or taxi phase), the GPS subsystem 213 applies 505 a single-axis statistical test (e.g., equation (4)) to each of the three LVLH axes to apply to the position solutions output by the set of filters. For each position solution output by the set of filters, the GPS subsystem 213 applies the single-axis statistical test to each of the three LVLH axes to the position solution to generate three ratio values. The GPS subsystem 213 identifies 507 from the position solutions one or more valid position solutions that each have corresponding ratios with value less than or equal to one on all three axes. The GPS subsystem 213 also identifies 507 from the position solutions any invalid position solutions that each have a corresponding ratio with a value greater than one on at least one of the three axes. The GPS subsystem 213 determines 509 a position solution of the aircraft based on the valid position solutions and excludes the invalid position solutions. In one embodiment, the GPS subsystem 213 may also generate protection levels for the aircraft 205 (e.g., one for each of the three independent axes) according to the position solution. The GPS subsystem 213 may perform 511 an aircraft operation during the mostly straight phase of flight using the position solution such as an aircraft takeoff, approach, landing, rollout, or taxi operation using the position solution. In one embodiment, the aircraft 205 may perform 513 an aircraft takeoff, approach, landing, rollout, or taxi operation using the position solution and the protection levels.

3.3 Method for Climb, Cruise, and Descent Operations

Figure 6:
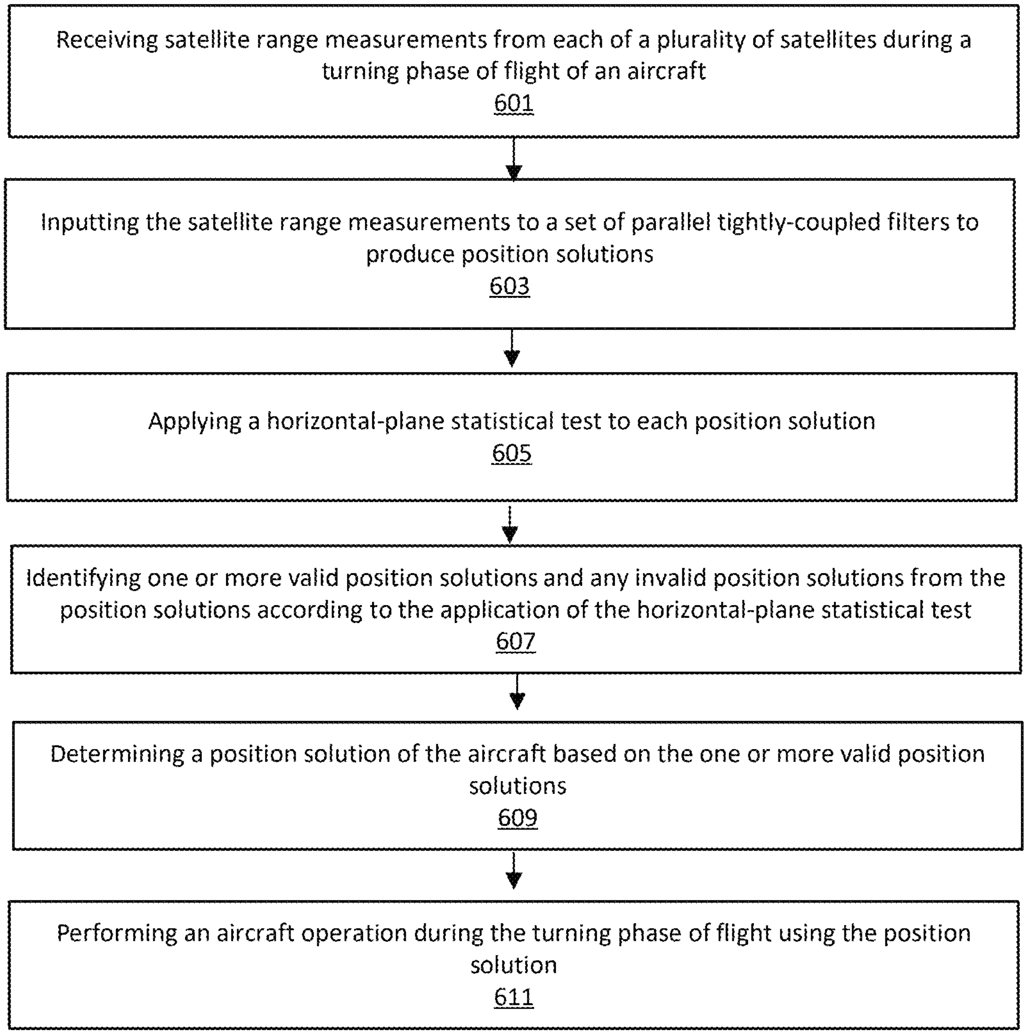
FIG. 6 is a flowchart illustrating a process for performing an aircraft climb, cruise, or descent operation during a turning phase of the aircraft using a position solution that is selecting using a horizontal-plane statistical test, according to one embodiment.

FIG. 6 is a flowchart illustrating a process 600 for performing an aircraft climb, cruise, or descent operation during a turning phase of the aircraft 205 using a position solution that is selecting using a horizontal-plane statistical test. The process can be implemented by one or more embodiments of the system 200 described above. A GPS subsystem 213 receives 601 satellite range measurements from each of a plurality of satellites of a GPS augmentation system during the turning phase (e.g., a climb, cruise, or descent phase) of the aircraft 205. The GPS subsystem 213 inputs 603 the satellite range measurements into a set of parallel tightly-coupled filters to produce a plurality of position solutions. Examples of the filters include a set of parallel Extended Kalman Filters (in one set of embodiments, Schmidt extended Kalman filters). Each filter in the set of filters outputs a corresponding position solution for the aircraft 205.

During the turning phase, the GPS subsystem 213 selects a horizontal-plane statistical test (e.g., equation (18)) to apply to the position solutions output by the set of filters. Applying the horizontal-plane statistical test rather than the three-axis check reduces false detections or wrong satellite exclusions caused by aircraft maneuvers performed during the climb, cruise, or descent phase of flight. For each position solution output by the set of filters, the GPS subsystem 213 applies 605 the horizontal-plane statistical test to the position solution to generate a value which is compared to a threshold value $T_{horizontal}$ defined by equation (17). The GPS subsystem 213 identifies 607 from the position solutions one or more valid position solutions that each have a corresponding value with a value less than or equal to the threshold value $T_{horizontal}$. The GPS subsystem 213 also identifies 607 from the position solutions any invalid position solutions (e.g., zero or more) that each have a corresponding value with a value greater than the threshold value $T_{horizontal}$. The GPS subsystem 213 determines 609 a position solution of the aircraft based on the valid position solutions and excludes the invalid position solutions. In one embodiment, the aircraft may also generate protection levels for the aircraft 205 (e.g., one for the combined horizontal axes and one for the vertical axis, if needed) according to the position solution. The aircraft 205 may perform 611 an aircraft operation such a turning operation, climb, cruise, or descent operation using the position solution during the turning phase. In one embodiment, the aircraft 205 may perform 511 an aircraft climb, cruise, or descent operation (e.g., a turn) using the position solution and the protection levels.

IV. Conclusion

Any computing systems and/or physical components of the aircraft 205 referred to in the specification may include redundant computing systems and/or physical components. In this manner, the availability, continuity, and integrity of aircraft systems for automated approaches and landings can be improved.

The system and method also include functionality for evaluating performance of other subsystems of the aircraft (e.g., navigation systems, etc.) to improve their performance or otherwise improve safety of a flight operation.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, one implementation of which is set forth in the following claims.

What is claimed is:

1. A computer-implemented method for aircraft operation of an aircraft, comprising:

determining, by the aircraft, which of a plurality of different phases of flight is a current phase of flight of the aircraft;

selecting, by the aircraft, a statistical test that corresponds to the determined phase of flight from a plurality of statistical tests, each of the plurality of statistical tests corresponding to at least one of the plurality of different phases of flight;

receiving, by the aircraft, satellite range measurements from a plurality of satellites;

inputting, by the aircraft, the satellite range measurements to a plurality of filters that output a plurality of position solutions of the aircraft based on the satellite range measurements, wherein a filter from the plurality of filters receives satellite range measurements from all of the plurality of satellites, and all remaining filters from the plurality of filters each receive satellite range measurements corresponding to one satellite of the plurality of satellites excluded from the generation of position solutions;

identifying from the plurality of position solutions, by the aircraft, one or more valid position solutions of the aircraft and any invalid position solutions of the aircraft by applying the selected statistical test to the plurality of position solutions;

determining, by the aircraft, a position solution of the aircraft based on the one or more valid position solutions; and performing, by the aircraft, an aircraft operation during the phase of flight using the position solution.

2. The computer-implemented method of claim 1, wherein the plurality of different phases of flight includes a turning phase of the aircraft and an approach-like phase of the aircraft, and selecting the statistical test comprises:

determining the aircraft is in the approach-like phase of flight; and selecting a single-axis statistical test from the plurality of statistical tests to apply to the plurality of position solutions responsive to the determination.

3. The computer-implemented method of claim 2, wherein the approach-like phase of flight includes a takeoff phase during which the aircraft transitions from moving along ground to flying in air, an approach phase during which an altitude of the aircraft decreases in preparation for landing of the aircraft, a landing phase during which the aircraft touches down on the ground, a rollout phase during which the aircraft proceeds down a runway as the aircraft slows to a taxi speed, and a taxi phase as the aircraft travels at the taxi speed to an assigned gate for the aircraft.

4. The computer-implemented method of claim 2, wherein applying the selected statistical test comprises:

applying the single-axis statistical test to each of the plurality of position solutions along each of a plurality of different axes including an along-track axis, a cross-track axis, and a vertical axis, wherein the single-axis statistical test applied to each position solution along each axis is based on an absolute value of a difference between the position solution along the axis and a position solution from the filter that receives the satellite range measurements from all of the plurality of satellites along the axis.

5. The computer-implemented method of claim 4, where the single-axis statistical test applied to each position solution along each axis is further based on a ratio of the absolute value of the difference and a variance of the difference under nominal conditions between the position solution along the axis and the position solution from the filter that receives the satellite range measurements from all of the plurality of satellites along the axis.

6. The computer-implemented method of claim 5, wherein identifying one or more valid position solutions of the aircraft and any invalid position solutions of the aircraft comprises:

comparing, by the aircraft, a value of the ratio for each of the plurality of position solutions with a first threshold value; and determining, for each of the plurality of position solutions, whether the position solution is a valid position solution or an invalid position solution based on the comparison.

7. The computer-implemented method of claim 6, wherein determining the position solution of the aircraft based on the one or more valid position solutions comprises:

selecting the position solution from the filter that receives the satellite range measurements from all of the plurality of satellites as the position solution of the aircraft responsive to all of the plurality of position solutions of the aircraft being valid.

8. The computer-implemented method of claim 6, wherein determining the position solution of the aircraft based on the one or more valid position solutions comprises:

selecting the position solution from one of the remaining filters that receives satellite range measurements corresponding to one satellite of the plurality of satellites excluded from the generation of position solutions as the position solution of the aircraft responsive to position solutions output from all other remaining filters being invalid.

9. The computer-implemented method of claim 2, further comprising:

determining that the aircraft is in the turning phase of flight; and selecting a horizontal-plane statistical test from the plurality of statistical tests to apply to the plurality of position solutions responsive to the determination, the horizontal-plane statistical test being different from the single-axis statistical test.

10. The computer-implemented method of claim 9, wherein the turning phase of flight includes a climb phase during which the aircraft ascends to a cruise altitude, a cruise phase during which the aircraft changes heading at a substantially constant airspeed and altitude, and a descent phase during which the aircraft begins to descend as the aircraft approaches a vicinity of an airport.

11. The computer-implemented method of claim 9, wherein applying the selected statistical test comprises:

applying the horizontal-plane statistical test to each of the plurality of position solutions, wherein the horizontal-plane statistical test applied to each position solution is based on a value of a square root of a sum of a first difference between the position solution along a first axis and a position solution from the filter that receives the satellite range measurements from all of the plurality of satellites along the first axis and a second difference between the position solution along a second axis that is different from the first axis and the position solution from the filter that receives the satellite range measurements from all of the plurality of satellites along the second axis.

12. The computer-implemented method of claim 11, wherein the second axis is orthogonal to the first axis.

13. The computer-implemented method of claim 11, wherein identifying one or more valid position solutions of the aircraft and any invalid position solutions of the aircraft comprises:

comparing, by the aircraft, the value of the square root of the sum of the first difference and the second difference for each position solution with a second threshold value for the position solution; and determining, for each of the plurality of position solutions, whether the position solution is a valid position solution or an invalid position solution based on the comparison.

14. The computer-implemented method of claim 13, further comprising:

calculating, by the aircraft, the second threshold value for each of the plurality of position solutions based on a variance under nominal conditions of a difference between the position solution and a position solution in a horizontal axis from the filter that receives the satellite range measurements from all of the plurality of satellites.

15. The computer-implemented method of claim 1, further comprising:

generating, by the aircraft, a protection level for the position solution, wherein the aircraft operation is performed using the position solution and the protection level.

16. The computer-implemented method of claim 1, wherein each of the plurality of filters is a set of Kalman Filters.

17. The computer-implemented method of claim 1, wherein each invalid position solution is indicative that a satellite that provided satellite range measurements to a filter from the plurality of filters that generated the invalid position solution is faulty.

18. A computer-implemented method of an aircraft, comprising:

determining, by the aircraft, that the aircraft is currently in a turning phase of flight from a plurality of different phases of flight;

selecting, by the aircraft, a horizontal-plane statistical test from a plurality of statistical tests responsive to determining that the aircraft is currently in the turning phase of flight;

receiving, by the aircraft, satellite range measurements from a plurality of satellites;

inputting, by the aircraft, the satellite range measurements to a plurality of filters that output a plurality of position solutions of the aircraft based on the satellite range measurements, the plurality of filters including a filter that receives satellite range measurements from all of the plurality of satellites, and all remaining filters each excludes satellite range measurements from a corresponding one satellite of the plurality of satellites;

identifying from the plurality of position solutions, by the aircraft, one or more valid position solutions of the aircraft and any invalid position solutions of the aircraft by applying the horizontal-plane statistical test to the plurality of position solutions;

determining, by the aircraft, a position solution of the aircraft based on the one or more valid position solutions; and performing, by the aircraft, an aircraft operation during the turning phase of flight using the position solution, wherein for each position solution the horizontal-plane statistical test is based on a square root of a sum of a difference between a position solution from a first remaining filter that excludes satellite range measurements from a first satellite of the plurality of satellites along a first axis and a position solution from the filter that receives satellite range measurements from all of the plurality of satellites along the first axis and a difference between a position solution from the first remaining filter that excludes satellite range measurements from the first satellite along a second axis that is different from the first axis and the position solution from the filter that receives satellite range measurements from all of the plurality of satellites along the second axis.

19. A computer-implemented method of an aircraft, comprising:

determining, by the aircraft, that the aircraft is currently in a mostly straight phase of flight during which the aircraft is aligned with a runway or other reference path from a plurality of different phases of flight;

selecting, by the aircraft, a single-axis statistical test to apply to each of a plurality of different axes from a plurality of statistical tests responsive to determining that the aircraft is currently in the mostly straight phase;

receiving, by the aircraft, satellite range measurements from a plurality of satellites;

inputting, by the aircraft, the satellite range measurements to a plurality of filters that output a plurality of position solutions of the aircraft based on the satellite range measurements, the plurality of filters including a filter that receives satellite range measurements from all of the plurality of satellites, and all remaining filters from the plurality of filters each excludes satellite range measurements from a corresponding one satellite of the plurality of satellites;

identifying from the plurality of position solutions, by the aircraft, one or more valid position solutions of the aircraft and any invalid position solutions of the aircraft by applying the single-axis statistical test to apply to each of a plurality of different axes for each of the plurality of position solutions; and determining, by the aircraft, a position solution of the aircraft based on the one or more valid position solutions; and performing, by the aircraft, an aircraft operation during the mostly straight phase of flight using the position solution, wherein the single-axis statistical test applied to each of the plurality of position solutions along each of the plurality of different axes is based on an absolute value of a difference between a position solution from a first filter that excludes satellite range measurements from a corresponding one satellite of the plurality of satellites along the axis and a position solution from the filter that receives satellite range measurements from all of the plurality of satellites along the axis.

* * * * *